US010664857B2

(12) United States Patent
Faith et al.

(10) Patent No.: US 10,664,857 B2
(45) Date of Patent: May 26, 2020

(54) DETERMINING OFFERS FOR A GEOFENCED GEOGRAPHIC AREA

(71) Applicant: RETAILMENOT, INC., Austin, TX (US)

(72) Inventors: John Newman Faith, Austin, TX (US); Eithan Zilkha, Austin, TX (US); Christopher Matthew Duty, Austin, TX (US)

(73) Assignee: RetailMeNot, Inc., Austin, TX (US)

(*) Notice: Subject to any disclaimer, the term of this patent is extended or adjusted under 35 U.S.C. 154(b) by 1408 days.

(21) Appl. No.: 13/928,833

(22) Filed: Jun. 27, 2013

(65) Prior Publication Data
US 2013/0332274 A1 Dec. 12, 2013

Related U.S. Application Data

(63) Continuation of application No. PCT/US2013/045186, filed on Jun. 11, 2013, which
(Continued)

(51) Int. Cl.
G06Q 30/02 (2012.01)
H04L 29/08 (2006.01)

(52) U.S. Cl.
CPC ......... G06Q 30/0222 (2013.01); G06Q 30/02 (2013.01); G06Q 30/0225 (2013.01);
(Continued)

(58) Field of Classification Search
CPC ........... G06Q 30/0222; G06Q 30/0239; G06Q 30/02; G06Q 30/0242; G06Q 30/0267;
(Continued)

(56) References Cited

U.S. PATENT DOCUMENTS 6,433,801 B1 8/2002 Moon et al.
2002/0010623 A1 1/2002 McCollom et al.
(Continued)

FOREIGN PATENT DOCUMENTS

AU 2012200475 A1 2/2012
WO WO0041121 A1 7/2000
(Continued)

OTHER PUBLICATIONS http://web.archive.org/web/20120503225532/http://www.retailmenot.com/.
(Continued)

Primary Examiner — Luis A Brown
Assistant Examiner — Robert C. Johnson
(74) Attorney, Agent, or Firm — Pillsbury Winthrop Shaw Pittman, LLP

(57) ABSTRACT

Provided is a computer-implemented process for determining offers for a geofenced geographic area. After a mobile user device traverses a geofence, merchants associated with a geofence having a geofence identifier are identified. Candidate offers associated with the merchants are identified and ranked according to ranking criteria. The ranked candidate offers are transmitted to a mobile user device. The ranked candidate offers are cached on the mobile user device and presented to the user via an offers notification. The user may view and redeem an offer by selecting the offers notification.

29 Claims, 12 Drawing Sheets

Related U.S. Application Data is a continuation of application No. 13/836,110, filed on Mar. 15, 2013, now abandoned, and a continuation of application No. 13/836,808, filed on Mar. 15, 2013, now Pat. No. 10,346,867, and a continuation of application No. 13/837,790, filed on Mar. 15, 2013, now Pat. No. 9,639,853, and a continuation of application No. 13/839,066, filed on Mar. 15, 2013, now Pat. No. 9,881,315, and a continuation of application No. 13/840,237, filed on Mar. 15, 2013, now abandoned.

(60) Provisional application No. 61/707,527, filed on Sep. 28, 2012, provisional application No. 61/665,740, filed on Jun. 28, 2012, provisional application No. 61/658,408, filed on Jun. 12, 2012, provisional application No. 61/658,404, filed on Jun. 11, 2012, provisional application No. 61/658,387, filed on Jun. 11, 2012.

(52) U.S. Cl.
CPC ..... *G06Q 30/0239* (2013.01); *G06Q 30/0242* (2013.01); *G06Q 30/0255* (2013.01); *G06Q 30/0256* (2013.01); *G06Q 30/0267* (2013.01); *G06Q 30/0269* (2013.01); *H04L 67/02* (2013.01)

(58) Field of Classification Search
CPC .......... G06Q 30/0256; G06Q 30/0269; G06Q 30/0255; G06Q 30/0225
USPC ........................................... 705/14.53, 14.58
See application file for complete search history.

(56) References Cited

U.S. PATENT DOCUMENTS

| | | | |
|---|---|---|---|
| 2003/0005448 A1 | 1/2003 | Axelsson et al. | |
| 2004/0003042 A1 | 1/2004 | Horvitz et al. | |
| 2006/0004631 A1* | 1/2006 | Roberts | G06Q 30/0207 |
| | | | 705/14.57 |
| 2007/0244746 A1 | 10/2007 | Issen et al. | |
| 2008/0176528 A1 | 7/2008 | Kim | |
| 2008/0294588 A1 | 11/2008 | Morris et al. | |
| 2009/0030794 A1 | 1/2009 | Scheflan et al. | |
| 2009/0222329 A1* | 9/2009 | Ramer | G06Q 30/02 |
| | | | 705/14.52 |
| 2009/0248505 A1 | 10/2009 | Finkelstein et al. | |
| 2010/0121710 A1* | 5/2010 | Chipman | G06Q 30/02 |
| | | | 705/14.51 |
| 2011/0010235 A1 | 1/2011 | Kenny | |
| 2011/0029363 A1 | 2/2011 | Gillenson et al. | |
| 2011/0066636 A1 | 3/2011 | Guido et al. | |
| 2011/0093318 A1* | 4/2011 | Guday | G06Q 30/00 |
| | | | 705/14.13 |
| 2011/0153401 A1 | 6/2011 | Jellema et al. | |
| 2011/0178867 A1 | 7/2011 | King | |
| 2011/0191160 A1 | 8/2011 | Blackhurst et al. | |
| 2011/0238474 A1 | 9/2011 | Carr et al. | |
| 2011/0243553 A1 | 10/2011 | Russell | |
| 2011/0251897 A1 | 10/2011 | Litvack et al. | |
| 2011/0270667 A1 | 11/2011 | Kenny | |
| 2011/0270690 A1 | 11/2011 | Martin-Cocher et al. | |
| 2011/0288917 A1 | 11/2011 | Wanek et al. | |
| 2012/0010938 A1 | 1/2012 | Standley et al. | |
| 2012/0036015 A1 | 2/2012 | Sheikh | |
| 2012/0116859 A1 | 5/2012 | Bone | |
| 2012/0143671 A1 | 6/2012 | Hansen et al. | |
| 2012/0143680 A1 | 6/2012 | Hansen et al. | |
| 2012/0143720 A1 | 6/2012 | Moser | |
| 2012/0209686 A1 | 8/2012 | Horowitz et al. | |
| 2012/0220277 A1 | 8/2012 | Gonynor | |
| 2012/0266079 A1 | 10/2012 | Lee et al. | |
| 2012/0284107 A1 | 11/2012 | Gernaat et al. | |
| 2012/0295645 A1 | 11/2012 | Yariv et al. | |
| 2012/0310826 A1 | 12/2012 | Chatterjee | |
| 2013/0006727 A1 | 1/2013 | Hoag et al. | |
| 2013/0041737 A1 | 2/2013 | Mishra et al. | |
| 2013/0117646 A1 | 5/2013 | Hansen et al. | |
| 2013/0188217 A1 | 7/2013 | Kluth | |

FOREIGN PATENT DOCUMENTS

| | | |
|---|---|---|
| WO | 2011094734 A2 | 8/2011 |
| WO | 2012061758 A2 | 5/2012 |

OTHER PUBLICATIONS http://web.archive.org/web/20110506114908/http:/www.retailmenot.com.
International Search Report & Written Opinion for PCT App. No. PCT/US2013/045143, dated Oct. 25, 2013. (pp. 1-13).
International Search Report & Written Opinion for PCT App. No. PCT/US2013/045145, dated Oct. 25, 2013. (pp. 1-13).
International Search Report & Written Opinion for PCT App. No. PCT/US2013/045132, dated Oct. 30, 2013. (pp. 1-12).
International Search Report & Written Opinion for PCT App. No. PCT/US2013/045135, dated Nov. 4, 2013. (pp. 1-13).
International Search Report & Written Opinion for PCT App. No. PCT/US2013/045139, dated Nov. 11, 2013. (pp. 1-13).
International Search Report & Written Opinion for PCT App. No. PCT/US2013/045186, dated Nov. 14, 2013. (pp. 1-12).

* cited by examiner

DETERMINING OFFERS FOR A GEOFENCED GEOGRAPHIC AREA

CROSS-REFERENCE TO RELATED APPLICATIONS

The present application is a continuation of pending PCT patent application PCT/US 13/45186, filed Jun. 11, 2013, which is hereby incorporated by reference for all purposes and claims priority to each of the following U.S. provisional patent applications, each of which is hereby incorporated by reference for all purposes: provisional application 61/707,527, filed Sep. 28, 2012; provisional application 61/665,740, filed Jun. 28, 2012; provisional application 61/658,408, filed Jun. 12, 2012; provisional application 61/658,404, filed Jun. 11, 2012; and provisional application 61/658,387, filed Jun. 11, 2012. PCT patent application PCT/US 13/45186 also claims priority to each of the following pending U.S. non-provisional patent applications, each of which is hereby incorporated by reference for all purposes: application Ser. No. 13/836,110 filed on Mar. 15, 2013; application Ser. No. 13/836,808 filed on Mar. 15, 2013; application Ser. No. 13/837,790 filed on Mar. 15, 2013; application Ser. No. 13/839,066 filed on Mar. 15, 2013; and application Ser. No. 13/840,237 filed on Mar. 15, 2013.

BACKGROUND OF THE INVENTION

1. Field of the Invention

The present invention relates generally to merchant offers and, more specifically, to offer-discovery systems.

2. Description of the Related Art

Offer-discovery systems provide a service by which merchants inform customers of offers, for example deals (e.g., discounts, favorable shipping terms, or rebates) or coupons (e.g., printable coupons for in-store use or coupon codes for use online). Typically, these systems store information about offers from a relatively large number of merchants and provide an interface by which customers can identify offers in which the customer is likely to be interested. Merchants have found the deal-discovery systems to be a relatively effective form of marketing, as cost-sensitive consumers are drawn to such systems due to their relatively comprehensive listings of offers, and as a result, the number of offers listed on such systems has increased in recent years. One consequence of this increase is that users (e.g., prospective customers of the merchants) face an increasingly complex task of identifying relevant offers on offer-discovery systems and recalling information about the offer when making a purchase. Moreover, such tasks are especially challenging for in-store offers that may depend on a user's proximity to a merchant's facility for relevancy and use.

SUMMARY OF THE INVENTION

The following is a non-exhaustive listing of some aspects of the present techniques. These and other aspects are described in the following disclosure.

In some embodiments, a computer-implemented method for determining relevant offers for a geofenced geographic area is provided. The method includes receiving, over a network from a mobile user device, a request for offers, the request comprising a geofence identifier associated with a geofence, the geofence defining a perimeter around a geographic area comprising one or more retail stores and identifying, via a processor, one or more merchants associated with the geofence. Additionally, the method includes identifying, via a processor, one or more candidate offers associated with the one or more merchants and ranking, via a processor, the one or more candidate offers based on ranking criteria. The method also includes transmitting, via a processor, the one or more ranked candidate offers to the mobile user device.

Additionally, in some embodiments a non-transitory tangible computer-readable memory is provided that stores instructions for determining relevant offers for a geofenced geographic area. The instructions, when executed by a processor, cause the processor to perform operations including: receiving, over a network from a mobile user device, a request for offers, the request comprising a geofence identifier associated with a geofence, the geofence defining a perimeter around a geographic area comprising one or more retail stores and identifying, via a processor, one or more merchants associated with the geofence. Additionally, the instructions, when executed by a processor, cause the processor to perform operations including: identifying, via a processor, one or more candidate offers associated with the one or more merchants and ranking, via a processor, the one or more candidate offers based on ranking criteria. Further, the instructions, when executed by a processor, cause the processor to perform operations including: transmitting, via a processor, the one or more ranked candidate offers to the mobile user device.

Further, in some embodiments, a computer-implemented method for determining relevant offers for a geofenced geographic area is provided. The method includes obtaining, via a processor, a detected traversal of a geofence, the geofence defining a perimeter around a geographic area comprising one or more retail stores associated with a respective one or more merchants and transmitting, via a network and from a mobile user device, a request for offers to an offers engine, the request comprising a geofence identifier associated with the traversed geofence. Additionally, the method includes receiving, via a processor, one or more ranked candidate offers from the offers engine and providing, via a processor, a user-selectable offers notification in a notification area of a user interface of the mobile user device.

Moreover, in some embodiments a non-transitory tangible computer-readable memory is provided that stores instructions for determining relevant offers for a geofenced geographic area. The instructions, when executed by a processor, cause the processor to perform operations including: obtaining, via a processor, a detected traversal of a geofence, the geofence defining a perimeter around a geographic area comprising one or more retail stores associated with a respective one or more merchants and transmitting, via a network and from a mobile user device, a request for offers to an offers engine, the request comprising a geofence identifier associated with the traversed geofence. Additionally, the instructions, when executed by a processor, cause the processor to perform operations including: includes receiving, via a processor, one or more ranked candidate offers from the offers engine and providing, via a processor, a user-selectable offers notification in a notification area of a user interface of the mobile user device.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
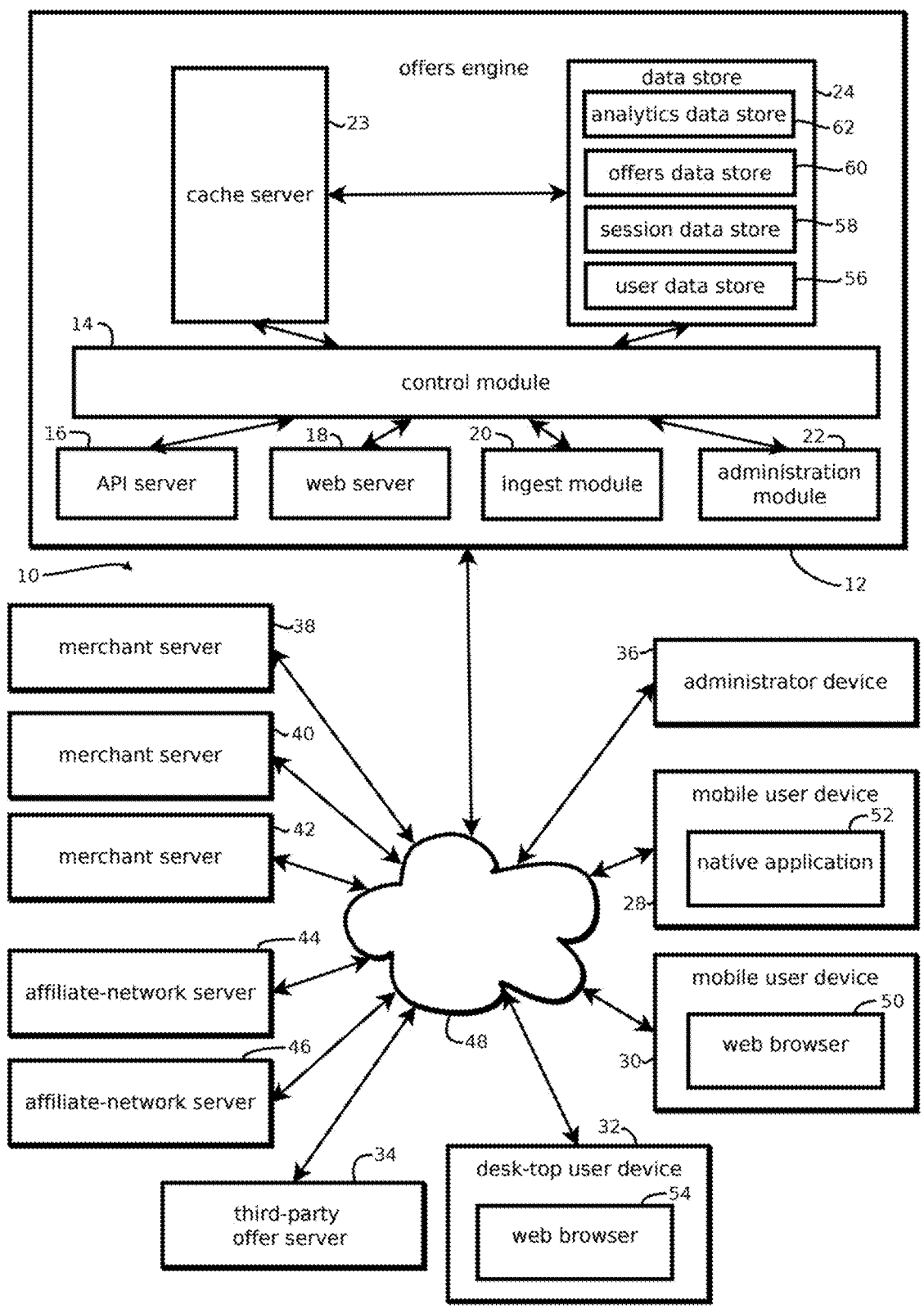
FIG. 1 illustrates an example of an offer-discovery system in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

FIG. 1 shows an embodiment of an offer-discovery system 10. The exemplary system 10 includes an offers engine 12 that, in some embodiments, is capable of reducing the burden on users attempting to identify offers relevant to them from among a relatively large pool of offers (e.g., more than 100, more than 1,000, or more than 10,000). To this end and others, the offers engine 12 maintains device-independent user profiles (or portions of user profiles) by which offers interfaces may be relatively consistently configured across multiple user devices with which the user interacts with the offers engine 12. Further, the offers engine 12, in some embodiments, includes a number of features expected to facilitate relatively quick identification of relevant offers by a user, features that include cached storage of data related to likely relevant offers, faceted presentation of offers by which users can select among offers within various categories, and a number of other techniques described below for assisting with offer identification. The offers engine 12 is also expected to facilitate relatively low operating costs by, in some embodiments, automating parts of the process by which offer related data is acquired from sources, such as affiliate networks merchants, administrators, or users, and automating parts of the process by which transaction data indicative of acceptance, settlement, or clearing of offers is obtained and processed.

These and other benefits are described in greater detail below, after introducing the components of the system 10 and describing their operation. It should be noted, however, that not all embodiments necessarily provide all of the benefits outlined herein, and some embodiments may provide all or a subset of these benefits or different benefits, as various engineering and cost tradeoffs are envisioned.

In the illustrated embodiment, the offers engine 12 includes a control module 14, an application program interface (API) server 16, a web server 18, an ingest module 20, an administration module 22, a data store 24, and a cache server 23. These components, in some embodiments, communicate with one another in order to provide the functionality of the offers engine 12 described herein. As described in greater detail below, in some embodiments, the data store 24 may store data about offers and users' interactions with those offers; the cache server 23 may expedite access to this data by storing likely relevant data in relatively high-speed memory, for example, in random-access memory or a solid-state drive; the web server 20 may serve webpages having offers interfaces by which users discover relevant offers; the API server 16 may serve data to various applications that process data related to offers; the ingest module 20 may facilitate the intake of data related to offers from affiliate networks, users, administrators, and merchants; and the administration module 22 may facilitate curation of offers presented by the API server 16 and the web server 18. The operation of these components 16, 18, 20, 22, 24, and 23 may be coordinated by the control module 14, which may bidirectionally communicate with each of these components or direct the components to communicate with one another. Communication may occur by transmitting data between separate computing devices (e.g., via transmission control protocol/internet protocol (TCP/IP) communication over a network), by transmitting data between separate applications or processes on one computing device; or by passing values to and from functions, modules, or objects within an application or process, e.g., by reference or by value.

Among other operations, the offers engine 12 of this embodiment presents offers to users; receives data from users about their interaction with the offers (for example, the user's favorite offers or offer attributes; statistics about the offers the user has identified, accepted, or otherwise provided data about; or the identity of other users with whom the user communicates about offers and the content of those communications; provided that users opt to have such data obtained); customizes the presentation of offers based on this received data; and facilitates the processing of compensation from merchants (either directly or through affiliate networks) as a result of users accepting (or taking a specific action, like clicking or viewing, in some embodiments or use cases) offers. This interaction with users may occur via a website viewed on a desktop computer, tablet, or a laptop of the user. And in some cases, such interaction occurs via a mobile website viewed on a smart phone, tablet, or other mobile user device, or via a special-purpose native application executing on a smart phone, tablet, or other mobile user device. Presenting and facilitating interaction with offers across a variety of devices is expected to make it easier for users to identify and recall relevant offers at the time the user is interested in those offers, which is often different from the time at which the user first discovers the offers. In particular, some embodiments allow users to store data indicative of offers relevant to that user using one device, such as a desktop computer in the user's home, and then view those offers at a later time, such as on a native mobile application when in a retail store.

To illustrate an example of the environment in which the offers engine 12 operates, the illustrated embodiment of FIG. 1 includes a number of components with which the offers engine 12 communicates: mobile user devices 28 and 30; a desk-top user device 32; a third party server 34; an administrator device 36; merchant servers 38, 40, and 42; and affiliate-network servers 44 and 46. Each of these devices communicates with the offers engine 12 via a network 48, such as the Internet or the Internet in combination with various other networks, like local area networks, cellular networks, or personal area networks.

The mobile user devices 28 and 30 may be smart phones, tablets, gaming devices, or other hand-held networked computing devices having a display, a user input device (e.g., buttons, keys, voice recognition, or a single or multi-touch touchscreen), memory (such as a tangible, machine-readable, non-transitory memory), a network interface, a portable energy source (e.g., a battery), and a processor (a term which, as used herein, includes one or more processors) coupled to each of these components. The memory of the mobile user devices 28 and 30 may store instructions that when executed by the associated processor provide an operating system and various applications, including a web browser 50 or a native mobile application 52. The native application 52, in some embodiments, is operative to provide an offers interface that communicates with the offers engine 12 and facilitates user interaction with data from the offers engine 12. Similarly, the web browser 50 may be configured to receive a website from the offers engine 12 having data related to deals and instructions (for example, instructions expressed in JavaScript) that when executed by the browser (which is executed by the processor) cause the mobile user device to communicate with the offers engine 12 and facilitate user interaction with data from the offers engine 12. The native application 52 and the web browser 50, upon rendering a webpage from the offers engine 12, may generally be referred to as client applications of the offers engine 12, which in some embodiments may be referred to as a server. Embodiments, however, are not limited to client/server architectures, and the offers engine 12, as illustrated, may include a variety of components other than those functioning primarily as a server.

The desk-top user device 32 may also include a web browser 54 that serves the same or similar role as the web browser 50 in the mobile user device 30. In addition, the desk-top user device 32 may include a monitor; a keyboard; a mouse; memory; a processor; and a tangible, non-transitory, machine-readable memory storing instructions that when executed by the processor provide an operating system and the web browser.

Third-party offer server 34 may be configured to embed data from the offers engine 12 in websites or other services provided by the third-party offer server 34. For example, third-party offer server 34 may be a server of a social networking service upon which users post comments or statistics about offers with which the user has interacted, or the users may use the offer server 34 to recommend offers to others or identify offers to avoid. In another example, third-party offer server 34 may include various services for publishing content to the Web, such as blogs, tweets, likes, dislikes, ratings, and the like. In another example, third-party offer server 34 provides services by which third-parties curate offers hosted by the offers engine 12.

Merchant servers 38, 40, and 42 host websites or other user accessible content interfaces by which users can accept offers hosted by the offers engine 12. In some embodiments, and in some use cases, the merchant servers 38, 40, and 42 host retail websites that present a plurality of items for sale by the merchant, a subset of which may include items to which offers apply, thereby generally making the item for sale more desirable to cost-sensitive consumers than under the terms presented by the merchant in the absence of the offer. For example, the offers may include free or discounted shipping, a discounted price, a bulk discount, a rebate, a referral award, or a coupon, such as a coupon acceptable by presenting a coupon code during checkout on the merchant website, or a printable or displayable coupon (e.g., on the screen of a mobile device) for in-store use, the printable or otherwise displayable coupon having, in some cases, a machine readable code (e.g., a bar code or QR code for display and scanning, or a code passed via near-field communication or Bluetooth™). In some embodiments, the merchant website includes a checkout webpage having an interface for the user to enter payment information and a coupon code, and the merchant website (either with logic on the client side or the server-side) may validate the coupon code entered by the user and, upon determining that the coupon code is valid, adjust the terms presented to the user for acceptance in accordance with the offer.

Some merchants may limit the number of uses of a given coupon, limit the duration over which the coupon is valid, or apply other conditions to use of the coupon, each of which may add to the burden faced by users seeking to find valid coupons applicable to an item the user wishes to purchase. As noted above, some embodiments of the offers engine 12 are expected to mitigate this burden.

Further, in some embodiments, the merchant servers 38, 40, and 42 provide data about offers to the offers engine 12 or (i.e., and/or, as used herein, unless otherwise indicated) data about transactions involving offers. In use cases in which the operator of the offers engine 12 has a direct affiliate-marketing relationship with one of the merchants of the merchant servers 38, 40, or 42, the transaction data may provide the basis for payments by the merchant directly to the operator of the offers engine 12. For example, payments may be based on a percentage of transactions to which offers were applied, a number of sales to which offers were applied, or a number of users who viewed or selected or otherwise interacted with an offer by the merchant.

Affiliate-network servers 44 and 46, in some embodiments and some use cases, are engaged when the entity operating the offers engine 12 does not have a direct affiliate-marketing relationship with the merchant making a given offer. In many affiliate marketing programs, merchants compensate outside entities, such as third-party publishers, for certain activities related to sales by that merchant and spurred by the outside entity. For example, in some affiliate marketing programs, merchants compensate an affiliate, such as the entity operating the offers engine 12, in cases in which it can be shown that the affiliate provided a given coupon code to a given user who then used that coupon code in a transaction with the merchant. Demonstrating this connection to the merchant is one of the functions of the affiliate-networks.

Affiliate-networks are used, in some use cases, because many coupon codes are not affiliate specific and are shared across multiple affiliates, as the merchant often desires the widest distribution of a relatively easily remembered coupon code. Accordingly, in some use cases, the merchant, affiliate network, and affiliate cooperate to use client-side storage to indicate the identity of the affiliate that provided a given coupon code to a user. To this end, in some embodiments, when a webpage offers interface is presented by the offers engine 12 in the web browsers 50 or 54, that webpage is configured by the offers engine 12 to include instructions to engage the affiliate network server 44 or 46 when a user selects an offer, for example, by clicking on, touching, or otherwise registering a selection of an offer. The website provided by the offers engine 12 responds to such a selection by, in some embodiments, transmitting a request to the appropriate affiliate-network server 44 or 46 (as identified by, for example, an associated uniform resource locator (URL) in the webpage) for a webpage or portion of a webpage (e.g., browser-executable content). The request to the affiliate-network server may include (e.g., as parameters of the URL) an identifier of the affiliate, the offer, and the merchant, and the returned content from the affiliate-network server may include instructions for the web browser 50 or 54 to store in memory (e.g., in a cookie, or other form of browser-accessible memory, such as a SQLite database or in a localStorage object via a localStorage.setItem command) an identifier of the affiliate that provided the offer that was selected.

The webpage from the offers engine 12 (or the content returned by the affiliate network server 44 or 46) may further include browser instructions to navigate to the website served by the merchant server 38, 40, or 42 of the merchant associated with the offer selected by the user, and in some cases to the webpage of the item or service associated with the offer selected by the user. When a user applies the offer, for example by purchasing the item or service or purchasing the item or service with the coupon code, the merchant server 38, 40, or 42 may transmit to the user device upon which the item was purchased browser instructions to request content from the affiliate network server 44 or 46, and this requested content may retrieve from the client-side memory the identifier of the affiliate, such as the operator of the offers engine 12, who provided the information about the offer to the user. The affiliate network may then report to the merchant the identity of the affiliate who should be credited with the transaction, and the merchant may compensate the affiliate (or the affiliate network may bill the merchant, and the affiliate network may compensate the affiliate), such as the operator of the offers engine 12. Thus, the affiliate network in this example acts as an intermediary, potentially avoiding the need for cross-domain access to browser memory on the client device, a feature which is generally not supported by web browsers for security reasons. (Some embodiments may, however, store in client-side browser-accessible memory an identifier of the affiliate upon user selection of the offer, with this value designated as being accessible via the merchant's domain, and provide the value to the merchant upon a merchant request following acceptance of the offer, without passing the identifier through an affiliate network, using a browser plug-in for providing cross-domain access to browser memory or a browser otherwise configured to provide such access.)

A similar mechanism may be used by the native application 52 for obtaining compensation from merchants In some embodiments, the native application 52 includes or is capable of instantiating a web browser, like the web browser 50, in response to a user selecting an offer presented by the native application 52. The web browser instantiated by the native application 52 may be initialized by submitting the above-mentioned request for content to the affiliate-network server 44 or 46, thereby storing an identifier of the affiliate (i.e., the entity operating the offers engine 12 in this example) in client-side storage (e.g., in a cookie, localStorage object, or a database) of the mobile user device 28, and thereby navigating that browser to the merchant website. In other use cases, the operator of the offers engine 12 has a direct relationship with the merchant issuing the offer, and the selection of an offer within the native application 52 or the desktop or mobile website of the offers engine 12 (generally referred to herein as examples of an offer interface) may cause the user device to request a website from the associated merchant with an identifier of the affiliate included in the request, for example as a parameter of a URL transmitted in a GET request to the merchant server 38, 40, or 42 for the merchant's website.

Administrator device 36 may be a special-purpose application or a web-based application operable to administer operation of the offers engine 12, e.g., during use by employees or agents of the entity operating the offers engine 12. In some embodiments, the administration module 22 may communicate with the administrator device 36 to present an administration interface at the administrator device 36 by which an administrator may configure offers interfaces presented to users by the offers engine 12. In some embodiments, the administrator may enter offers into the offers engine 12; delete offers from the offers engine 12; identify offers for prominent placement within the offers interface (e.g., for initial presentation prior to user interaction); moderate comments on offers; view statistics on offers, merchants, or users; add content to enhance the presentation of offers; or categorize offers.

Thus, the offers engine 12, in some embodiments, operates in the illustrated environment by communicating with a number of different devices and transmitting instructions to various devices to communicate with one another. The number of illustrated merchant servers, affiliate network servers, third-party servers, user devices, and administrator devices is selected for explanatory purposes only, and embodiments are not limited to the specific number of any such devices illustrated by FIG. 1.

The offers engine 12 of some embodiments includes a number of components introduced above that facilitate the discovery of offers by users. For example, the illustrated API server 16 may be configured to communicate data about offers via an offers protocol, such as a representational-state-transfer (REST)-based API protocol over hypertext transfer protocol (HTTP). Examples of services that may be exposed by the API server 18 include requests to modify, add, or retrieve portions or all of user profiles, offers, or comments about offers. API requests may identify which data is to be modified, added, or retrieved by specifying criteria for identifying records, such as queries for retrieving or processing information about particular categories of offers, offers from particular merchants, or data about particular users. In some embodiments, the API server 16 communicates with the native application 52 of the mobile user device 28 or the third-party offer server 34.

The illustrated web server 18 may be configured to receive requests for offers interfaces encoded in a webpage (e.g. a collection of resources to be rendered by the browser and associated plug-ins, including execution of scripts, such as JavaScript™, invoked by the webpage). In some embodiments, the offers interface may include inputs by which the user may request additional data, such as clickable or touchable display regions or display regions for text input. Such inputs may prompt the browser to request additional data from the web server 18 or transmit data to the web server 18, and the web server 18 may respond to such requests by obtaining the requested data and returning it to the user device or acting upon the transmitted data (e.g., storing posted data or executing posted commands). In some embodiments, the requests are for a new webpage or for data upon which client-side scripts will base changes in the webpage, such as XMLHttpRequest requests for data in a serialized format, e.g. JavaScript™ object notation (JSON)

or extensible markup language (XML). The web server 18 may communicate with web browsers, such as the web browser 50 or 54 executed by user devices 30 or 32. In some embodiments, the webpage is modified by the web server 18 based on the type of user device, e.g., with a mobile webpage having fewer and smaller images and a narrower width being presented to the mobile user device 30, and a larger, more content rich webpage being presented to the desk-top user device 32. An identifier of the type of user device, either mobile or non-mobile, for example, may be encoded in the request for the webpage by the web browser (e.g., as a user agent type in an HTTP header associated with a GET request), and the web server 18 may select the appropriate offers interface based on this embedded identifier, thereby providing an offers interface appropriately configured for the specific user device in use.

The illustrated ingest module 20 may be configured to receive data about new offers (e.g., offers that are potentially not presently stored in the data store 24), such as data feeds from the affiliate network servers 44 and 46, identifications of offers from user devices 28, 30, or 32, offers identified by third-party offer server 34, offers identified by merchant servers 38, 40, or 42, or offers entered by an administrator via the administrator device 36. In some embodiments, the ingest module 20 may respond to receipt of a record identifying a potentially new offer by querying the data store 24 to determine whether the offer is presently stored. Upon determining that the offer is not presently stored by the data store 24, the ingest module 20 may transmit a request to the data store 24 to store the record. In some cases, the data about new offers may be an affiliate data-feed from an affiliate network containing a plurality of offer records (e.g., more than 100), each record identifying offer terms, a merchant, a URL of the merchant associated with the offer, a product description, and an offer identifier. The ingest module 22 may periodically query such data-feeds from the affiliate-network servers 44 or 46, parse the data-feeds, and iterate through (or map each entry to one of a plurality of processes operating in parallel) the records in the data-feeds. Bulk, automated processing of such data-feeds is expected to lower operating costs of the offers engine 12.

The administration module 22 may provide an interface by which an administrator operating the administrator device 36 curates and contextualizes offers. For example, the administration module 22 may receive instructions from administrator that identify offers to be presented in the offer interface prior to user interaction with the offer interface, or offers to be presented in this initialized offers interface for certain categories of users, such as users having certain attributes within their user profile. Further, in some embodiments, the administration module 22 may receive data descriptive of offers from the administrator, such as URLs of images relevant to the offer, categorizations of the offer, normalized data about the offer, and the like.

The illustrated data store 24, in some embodiments, stores data about offers and user interactions with those offers. The data store 24 may include various types of data stores, including relational or non-relational databases, document collections, hierarchical key-value pairs, or memory images, for example. In this embodiment, the data store 24 includes a user data store 56, a session data store 58, an offers data store 60, and an analytics data store 62. These data stores 56, 58, 60, and 62 may be stored in a single database, document, or the like, or may be stored in separate data structures.

In this embodiment, the illustrated user data store 56 includes a plurality of records, each record being a user profile and having a user identifier, a list of offers (e.g., identifiers of offers) identified by the user as favorites, a list of categories of offers identified by the user as favorites, a list of merchants identified by the user as favorites, account information for interfacing with other services to which the user subscribes (e.g., a plurality of access records, each record including an identifier of a service, a URL of the service, a user identifier for the service, an OAuth access token credential issued by the service at the user's request, and an expiration time of the credential), a user password for the offers engine 12, a location of the user device or the user (e.g., a zip code of the user), and a gender of the user. In some embodiments, each user profile includes a list of other users identified by the user of the user profile as being people in whose commentary on, or curation of, offers the user is interested, thereby forming an offers-interest graph. In some embodiments, users have control of their data, including what is stored and who can view the data, and can choose to opt-in to the collection and storage of such user data to improve their experience with the offers engine 12.

In this embodiment, the session data store 58 stores a plurality of session records, each record including information about a session a given user is having or has had with the offers engine 12. The session records may specify a session identifier, a user identifier, and state data about the session, including which requests have been received from the user and what data has been transmitted to the user. Session records may also indicate the IP address of the user device, timestamps of exchanges with the user device, and a location of the user device (e.g., retail store or aisle in a retail store in which the user device is located).

The illustrated offers data store 60, in some embodiments, includes a plurality of offer records, each offer record may identify a merchant, offers by that merchant, and attributes of the relationship with the merchant, e.g., whether there is a direct relationship with the merchant by which the merchant directly compensates the operator of the offers engine 12 or whether the merchant compensates the operator of the offers engine 12 via an affiliate network and which affiliate network. The offers by each merchant may be stored in a plurality of merchant-offer records, each merchant-offer record may specify applicable terms and conditions of the offer, e.g., whether the offer is a discount, includes free or discounted shipping, requires purchase of a certain number of items, is a rebate, or is a coupon (which is not to suggest that these designations are mutually exclusive). In records in which the offer is a coupon, the record may further indicate whether the coupon is for in-store use (e.g. whether the coupon is associated with a printable image for presentation at a point-of-sale terminal, a mobile device-displayable image, or other mediums) or whether the coupon is for online use and has a coupon code, in which case the coupon code is also part of the merchant-offer record. The merchant-offer records may also include an expiration date of the offer, comments on the offer, rankings of the offer by users, a time at which the offer was first issued or entered into the offers engine 12, and values (e.g., binary values) indicating whether users found the offer to be effective, with each value or ranking being associated with a timestamp, in some embodiments. The values and rankings may be used to calculate statistics indicative of the desirability of the offer and likely success of accepting the offer. The timestamps associated with the values, rankings, and time of issuance or entry into the offers engine 12 may also be used to weight rankings of the offer, with older values being assigned less weight than newer values and older offers being ranked lower than newer offers, all other things being equal, as many offers expire or have a limited number of uses.

The illustrated analytics data store 62 may store a plurality of records about historical interactions with the offers engine 12, such as aggregate statistics about the performance of various offers. In some embodiments, the analytics data store 62 stores a plurality of transaction records, each transaction record identifying an offer that was accepted by a user at a merchant, the merchant, the time of presentation of the offer to the user, and an indicator of whether the merchant has compensated the entity operating the offers engine 12 for presentation of the offer to the user. Storing and auditing these transaction records is expected to facilitate relatively accurate collection of payments owed by merchants and identification of future offers likely to lead to a relatively high rates of compensation for prominent presentation based on past performance of offers having similar attributes.

The cache server 23 stores a subset of the data in the data store 24 that is among the more likely data to be accessed in the near future. To facilitate relatively fast access, the cache server 23 may store cached data in relatively high speed memory, such as random access memory or a solid-state drive. The cached data may include offers entered into the offers engine 12 within a threshold period of time, such as offers that are newer than one day. In another example, the cache data may include offers that are accessed with greater than a threshold frequency, such as offers that are accessed more than once a day, or offers accessed within the threshold, such as offers accessed within the previous day. Caching such offer data is expected to facilitate faster access to offer data than systems that do not cache offer data.

The illustrated control module 14, in some embodiments, controls the operation of the other components of the offers engine 12, receiving requests for data or requests to add or modify data from the API server 16, the web server 18, the ingest module 20, and the administration module 22, and instructing the data store 24 to modify, retrieve, or add data in accordance with the request. The control module 14 may further instruct the cache server 23 to modify data mirrored in the cache server 23. In some embodiments, the cache server 23 may be updated hourly, and inconsistent data may potentially be maintained in the cache server 23 in order to conserve computing resources.

The illustrated components of the offers engine 12 are depicted as discrete functional blocks, but embodiments are not limited to systems in which the functionality described herein is organized as illustrated by FIG. 1. The functionality provided by each of the components of the offers engine 12 may be provided by software or hardware modules that are differently organized than is presently depicted, for example such software or hardware may be intermingled, broken up, distributed (e.g. within a data center or geographically), or otherwise differently organized. The functionality described herein may be provided by one or more processors of one or more computers executing code stored on a tangible, non-transitory, machine readable medium.

Figure 2:
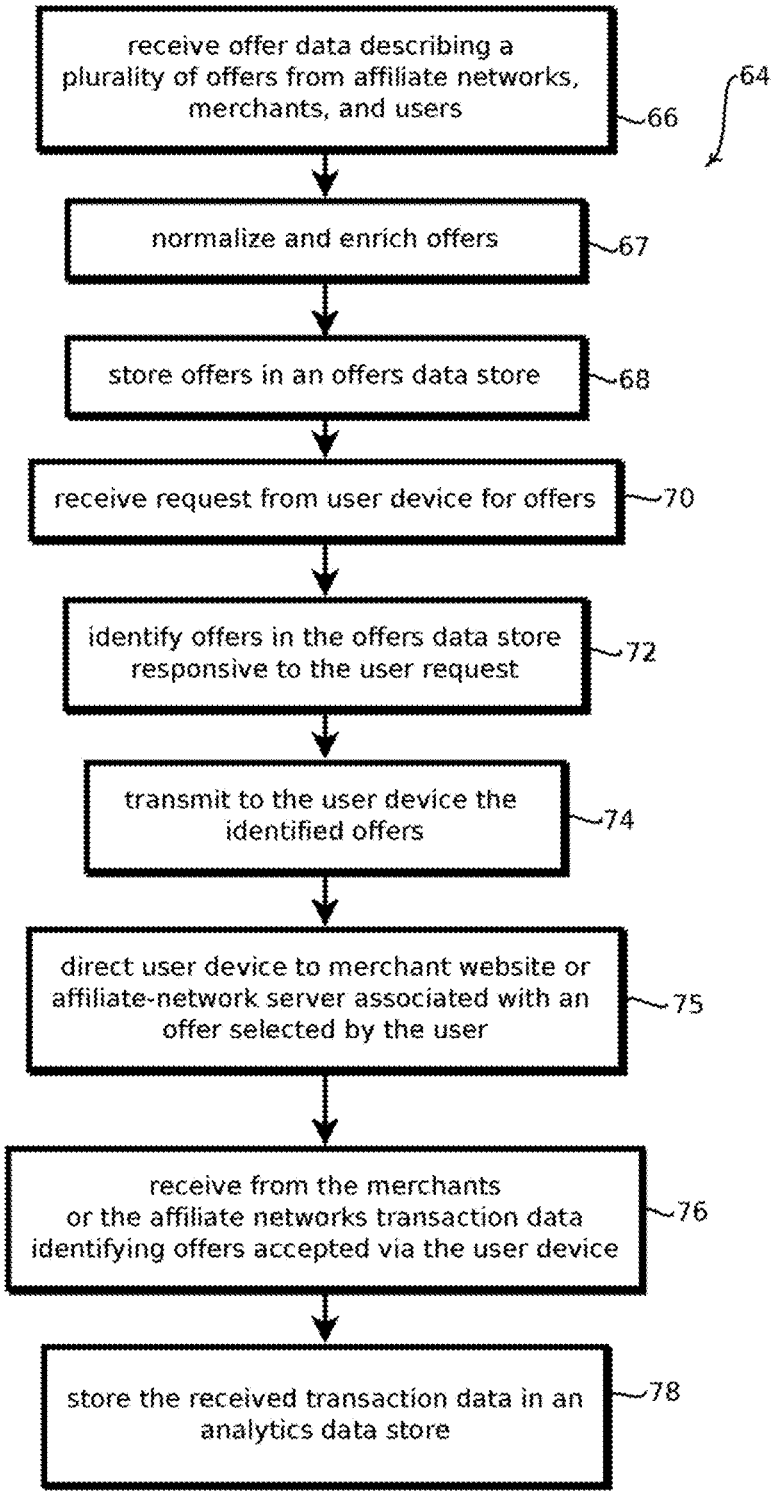
FIG. 2 illustrates an example of a process by which an offers engine in the offer-discovery system of FIG. 1, in some embodiments, obtains and processes data related to offers.

FIG. 2 is a flowchart of a process 64 for acquiring data related to offers within some embodiments of the offer engine 12 discussed above. In this embodiment, the process 64 begins with receiving offer data describing a plurality of offers from affiliate networks, merchants, and users, as illustrated by block 66. This step may be performed by the above-mentioned ingest module 20. As noted above, the received offer data may be received from one or all of these sources. The received offer data may be received via an offer interface by which users associated with these sources enter data about offers, or the received offer data may be received in a predefined format, such as a serialized data format, in an automatic data feed pushed or pulled periodically or in response to the availability of new data from affiliate networks or merchants. Receiving the offer data may include determining whether the offer data is redundant to offer data already received and normalizing the offer data.

The process 64, in some embodiments, includes normalizing and enriching the offer data. Normalizing may include normalizing field names of the data and normalizing the way in which dates are expressed, for example. Enriching may include associating images with the offers for presentation with the offers and adding metadata to the offers to assist users searching for offers.

Next, in the present embodiment, the received offer data is stored in an offer data store, as indicated by block 68. Storing the offer data in the offer data store may include identifying a merchant to which the offer pertains and storing the offer in a merchant-offer record associated with that merchant. Further, some embodiments may include inserting the offer in order in a sorted list of offers for relatively fast retrieval of offers using a binary search algorithm or other techniques to facilitate relatively quick access to data that has been preprocessed (e.g., using a prefix trie). In some embodiments, storing the received offer may further include updating hash tables by which the offer may be retrieved according to various parameters, each hash table being associated with one parameter and including a hash key value calculated based on the parameter and paired with an address of the offer. Such hash tables are expected to facilitate relatively fast access to a given offer as the need to iterate through potentially all offers meeting certain criteria may be potentially avoided.

In some embodiments, the process 64 further includes receiving a request from a user device for offers, as indicated by block 70. The request may specify criteria for identifying offers, such as categories of offers, search terms for offers, or requests for offers designated as favorites.

Next, the present embodiment includes identifying offers in the offer data store responsive to the user request, as indicated by block 72. Identifying offers in the offer data store may be performed by the above-mentioned controller 14 (FIG. 1) by constructing a query to the offer data store 60 based on a request received from the web server 18 or the API server 16. The query may be transmitted to the offer data store 60, or to the cache server 23, each of which may return responsive records.

Next, the identified offers are transmitted to the user device, as indicated by block 74. Transmitting the identified offers may include transmitting the identified offers in an offer interface, such as a webpage, or an API transmission to a native mobile application, for example by the web server 18, or the API server 16 of FIG. 1, respectively.

The device receiving the identified offers may, in response, perform a process described below with reference to FIG. 3 by which additional offers are requested or an offer is selected and a purchase is executed. This process of FIG. 3 and steps 70 through 74 of FIG. 2 may be repeated numerous times, in some use cases, before advancing to the next steps. Further, the steps 66 through 68 may be repeated numerous times independently of (e.g., concurrent with) the performance of steps 70 through 74 of FIG. 2 (which is not to suggest that other steps described herein may not also be executed independently). That is, the process 64 may undergo step 66 through 68, for example, 50 times within a given time, while performing steps 70 through 74 500 times within that given time, and performing the remaining steps of process 64 a single time.

Figure 3:
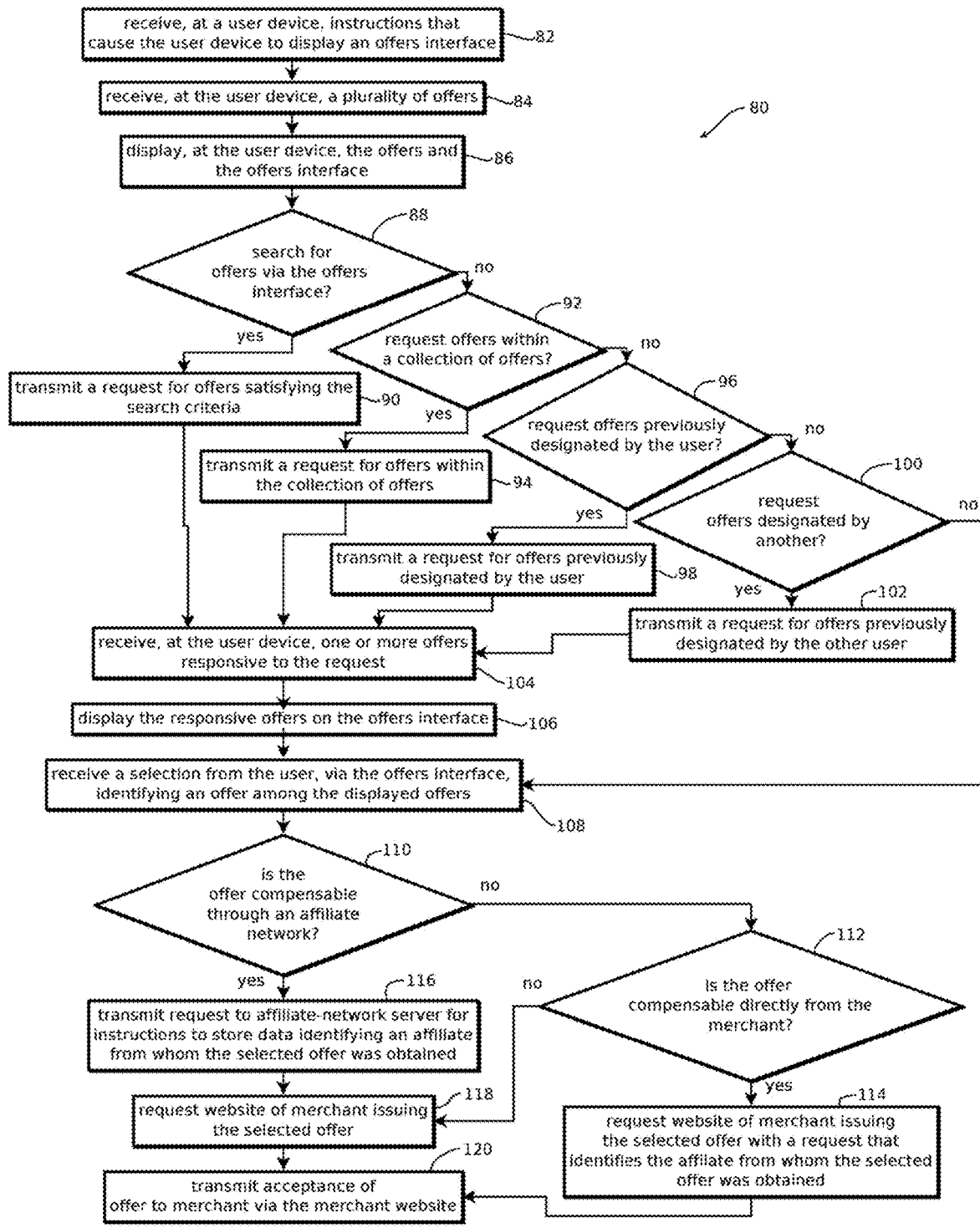
FIG. 3 illustrates an example of a process by which a user device in the offer-discovery system of FIG. 1, in some embodiments, obtains and presents to users data related to offers.

In some embodiments, a user device undergoing the process of FIG. 3 may indicate to an offers engine that the user has selected an offer (e.g., by clicking on or touching a selectable element in an offers interface associated with the offer). In response, the offers engine may direct the user device to an affiliate-network server or a merchant server associated with the offer, as illustrated by block 75.

Next, this embodiment of the process 64 includes receiving from merchants or affiliate networks transaction data identifying offers accepted via the user device, as illustrated by block 76. The transaction data may be pulled from these sources, for example, by the ingest module 20 of FIG. 1, periodically, or in response to some threshold number of transactions having occurred.

Next, in this embodiment, the receipt transaction data may be stored in an analytics data store, as indicated by block 78. In some embodiments, this data may be stored in the analytics data store 62 of FIG. 1. Storing the transaction data is expected to facilitate the identification of attributes of relatively profitable offers, as the transaction data indicates which offers historically yielded compensable transactions. Further, storing the transaction data is expected to facilitate relatively accurate auditing of payments from merchants or affiliate networks.

FIG. 3 is a flowchart of an embodiment of a process 80 that provides an example of an offer interface at a user device. The process 80 may be performed by the above-mentioned native application 52 or web browser 50 or 54 in cooperation with the offers engine 12.

Some embodiments of process 80 begin with receiving, at a user device, instructions that cause the user device to display an offers interface, as indicated by block 82. The received instructions may be in the form of a downloaded native application, such as one downloaded from an application store hosted by a provider of mobile devices, or the received instructions may be in the form of a website received from the offers engine 12 and rendered in a browser of the user device.

In some embodiments, the process 80 further includes receiving, at the user device, a plurality of offers, as indicated by block 84, and displaying, at the user device, the offers in the offer interface, as indicated by block 86. The offers may be received at approximately the same time the instructions of step 82 are received, for example along with a webpage, or the offers may be received at a later date, for example during a session subsequent to downloading the native application.

The offers interface may include inputs by which the user may search, filter, or otherwise browse offers having various attributes. Some of these interfaces are described below with reference to steps performed to determine whether the user has engaged these inputs. In some embodiments, determining whether the user has engaged these inputs may be performed by an event handler executed by the user device, the event handler causing the user device to perform the corresponding, below-described requests to the offers engine 12 based on the type of event, e.g., whether the user touched, clicked, or otherwise selected a particular button on the offers interface.

Illustrated process 80 includes determining whether the user is searching for offers, as indicated by block 88. With the offers interface, the user may express their intention to search for offers by entering search terms in a text entry box and selecting a button to request a search in accordance with the entered search term. Upon selecting this button, the user device may transmit a request for offers satisfying the entered search criteria, as indicated by block 90. The transmitted request may be in the faun of a GET request or an API call to the web server 18 or the API server 16 of the offers engine 12 of FIG. 1.

In some embodiments, the process 80 further includes determining whether the user requests offers within a collection of offers, as indicated by block 92. The offers interface may include selectable inputs that identify the collections, such as clickable collection names, collection selection buttons, or collection selection tabs. Examples of collections include categories of goods or services, such as sporting goods, house-wares, groceries, and the like; collections of modes of coupon redemption, such as in-store coupon redemption and online coupon redemption; collections based on offer statistics, such as newest offers, most popular offers, highest ranked offers; collections of offers designated by a user or other users; or collections based the value conferred by the offer, such as discounts, free shipping, rebates, and referral fees. Upon determining that the user has requested offers within a collection, the user device may transmit a request for offers within the collection to the offers engine 12, as indicated by block 94, which may return data responsive to the request.

In some embodiments, the process 80 includes determining whether the user requests offers previously designated by the user, as indicated by block 96. In some embodiments, the offers interface may include an input by which a user can designate an offer, such as designating offers as being a user favorite, designating offers as being ranked in a particular fashion, or designating offers as likely being of interest to some other user, such as users adjacent one another in a social graph. The offers interface may include an input for a user to make designations, such as a user selectable input labeled "add to my favorites," or "add to my wallet," and an input for a user to request offers having a designation, such as a user selectable input labeled "view my favorites." or "view my wallet." Upon determining that the user made such a request, the process 80 includes transmitting a request for the offers previously designated by the user, as indicated by block 88. The transmission may be made to the offers engine 12, to the API server 16 or the web server 18, as described above with reference to FIG. 1, and may include an identification of the designation and the user.

The process 80, in some embodiments, further includes determining whether the user requests offers previously designated by another user, as indicated by block 100. The offers interface, in some embodiments, may include an input by which a user makes such a request, such as a user selectable input labeled "offers recommended by my friends." Upon determining that the user has made such a request, the process 80 transmits a request for offers previously designated by the other user (or users), as indicated by block 102. Again, the transmission may be to the offers engine 12 of FIG. 1, which may store or otherwise have access to offers designated by other users and a social graph of the user by which responsive offers are identified. Further, the offers interface may include an input by which the user may view identifiers of other users and add the other users to an offer-interest graph of the user. This offer interest graph may be referenced by the offers engine 12 to identify offers in response to the request of step 102.

The process 80 further includes, in some embodiments, receiving, at the user device, one or more offers responsive to the request, as indicated by block 104, and displaying the responsive offers on the offers interface, as indicated by block 106.

In some embodiments and some use cases, a selection from the user is received via the offers interface, thereby identifying an offer among the displayed offers, as indicated by block 108. In some embodiments, each of the offers may be displayed with an associated input by which the user selects the offer, such as a touchable or clickable button, region, or text. The selection, in some embodiments, may cause the offers interface to request additional data from the offers engine, such as instructions from the offers engine to navigate to an affiliate-network server associated with the offer or to navigate to a merchant server associated with the offer. In other embodiments, such instructions may be present within the offers interface, e.g., in the form of URLs linking to these servers.

The process 80 further includes determining whether the selected offer is compensable through an affiliate network, as indicated by block 110. This determination may be made by the offers engine 12, in some embodiments, for each of the offers being displayed prior to transmission of the offers to the user device. For example, each offer may be associated with a designation indicating whether the offer is compensable in this fashion, and the designation may be transmitted along with the offer, for instance, by associating the offer with HTML or JavaScript™ that so designate the offer, or by including a field including the designation in a response to an API call for each offer. The user device, in some embodiments, may take different actions depending on the designation associated with the selected offer.

Upon determining that the selected offer is not compensable through an affiliate network, the process 80 of this embodiment includes determining whether the selected offer is compensable directly from the merchant associated with the offer, as indicated by block 112. Again, the determination of block 112 may be performed, in some embodiments, by the offers engine 12 for each of the offers being displayed prior to transmission of the displayed offers, and each displayed offer may be associated with a designation based on the results of the determination, such as different HTML or JavaScript™ or a different field value in an API response. The user device may take different actions depending on this designation.

Upon determining that the selected offer is not compensable directly from the merchant, the process 80 may proceed to block 118 described below. Upon determining that the selected offer is compensable, the process 80, in this embodiment, may proceed to request the website of the merchant issuing the selected offer with a request that identifies the affiliate from whom the selected offer was obtained, as indicated by block 114. The request may be in the form of a URL having as a parameter an identifier of the entity operating the offer engine 12, thereby indicating to the merchant that the affiliate should be compensated in accordance with an arrangement between the merchant and the affiliate. Upon performance of step 114, the process 80 of the present embodiment proceeds to step 120 described below.

As indicated by block 110, upon determining that the selected offer is compensable through an affiliate network, the process 80 proceeds to transmit a request to the affiliate-network server for instructions to store data identifying an affiliate from whom the selected offer was obtained, as indicated by block 116. This request may be a request for content from the affiliate-network server that is not displayed to the user, or is not displayed to the user for an appreciable amount of time (e.g., less than 500 ms), and the request may include an identifier of the affiliate, the merchant, and the offer. The requested content may cause the user device to store in persistent memory of the browser of the user device (e.g., memory that lasts between sessions, such as a cookie or a database of the browser) an identifier of the affiliate operating the offers engine 12. This value may be retrieved later by the affiliate-network at the instruction of the merchant upon the user accepting the offer, for example by the user using a coupon code associated with the offer at the merchant, thereby allowing the merchant (or the affiliate network) to identify the appropriate party to compensate for the sale.

Upon transmitting the request the affiliate network server, the process 80 further includes requesting the website of the merchant issuing the selected offer, as indicated by block 118, and transmitting acceptance of the offer to the merchant via the merchant's website, as indicated by block 120. Accepting the offer, as noted above, may cause the merchant to compensate the affiliate operating the offers engine 12.

The process 80 of FIG. 3 is expected to facilitate relatively fast access to offers that are likely to be relevant to a user, as each of the determinations of step 88, 92, 96, and 100 provide different paths by which the user can specify offers in which the user is likely to be interested. Further, the determinations of step 110 and 112 provide dual mechanisms by which the operator of the offers engine 12 can be compensated, thereby potentially increasing revenue.

As mentioned above, offers may include offers redeemable at a merchant facility (e.g., a retail store) and may be referred to as "in-store offers." In some embodiments, the offers engine 12 may provide such offers to a user in response to a user's traversal of a geofence. As used herein, the term "geofence" refers to a virtual perimeter for a real-world geographic area. As described further below, when a user crosses a geofence, offers relevant to merchant facilities within the geographic area of the geofenced perimeter are provided to the user via a user device. The geographic area may include, for example, an indoor shopping mall, an outdoor shopping mall, a shopping district, an airport, or any other suitable geographic area having merchant facilities.

Figure 4:
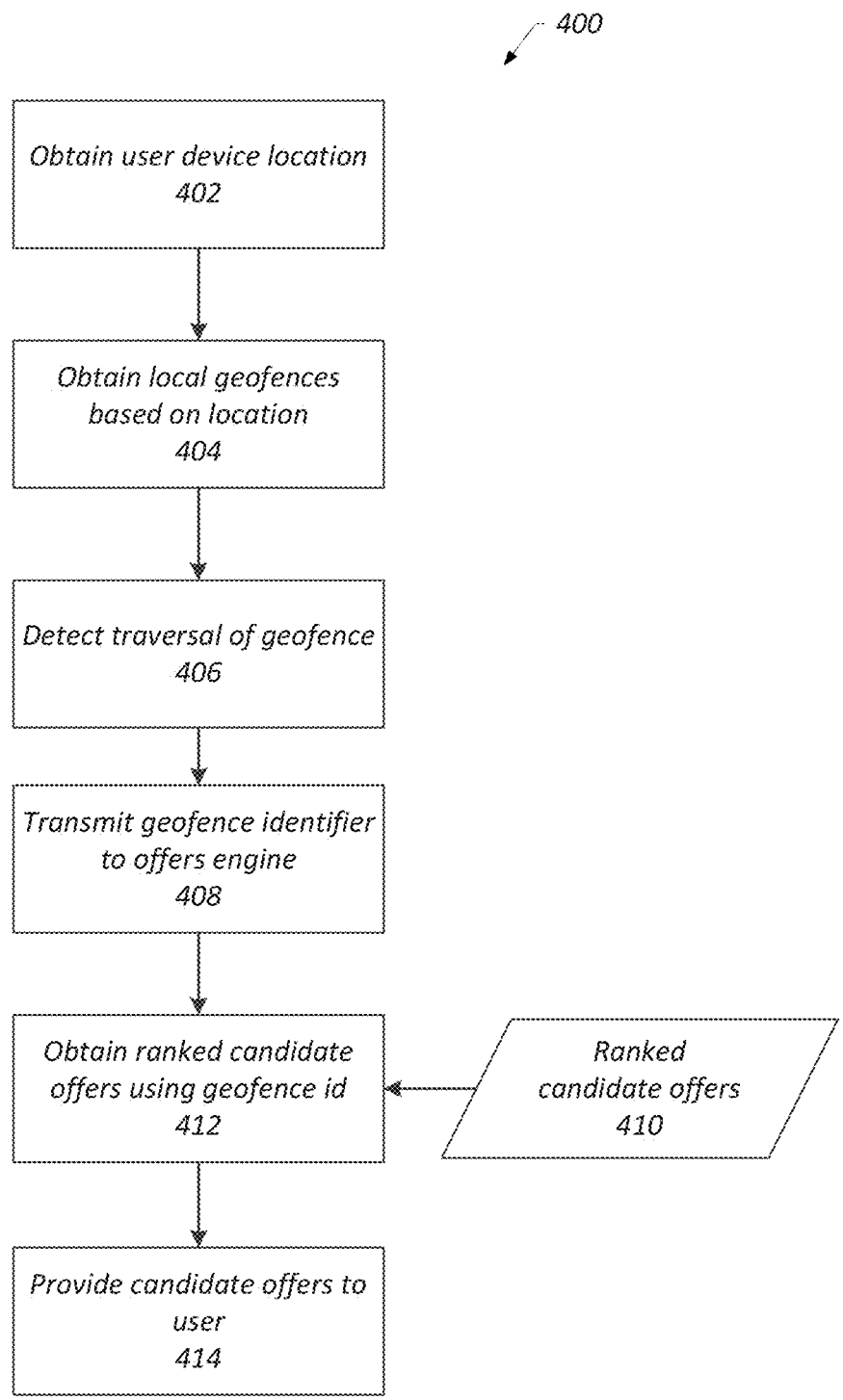
FIG. 4 is a block diagram of a process for obtaining offers in response to traversal of a geofence in accordance with an embodiment of the present invention.

FIG. 4 depicts a process 400 for obtaining offers in response to traversal of a geofence in accordance with an embodiment of the present invention. The process 400 may be executed by, for example, a user device such as the mobile user device 28. In such embodiments, some or all steps of the process 400 may be implemented via the native application 52 executed by the mobile user device 28. Initially, the current user device location is obtained (block 402). As will be appreciated, in some embodiments the current user device location is obtained via communication with a satellite-based positioning system (e.g., GPS). In some embodiments, other suitable locating techniques, such as Wi-Fi based locating, IP address geolocation, or other techniques may be used alone or in combination with other locating techniques.

Next, local geofences are obtained based on the user device location (block 404). The local geofences may be obtained from the offers engine 12 and may be stored (e.g., cached) in a memory of the user device. The local geofences may be selected from a database of geofences based on the proximity of the user location to each of the geofence locations. The proximity for selecting the local geofences may vary based on factors such as the user's location at a given point in time or the user's location over a set of points in time. In some embodiments, a geofence may defined by a polygon enclosing an area. The polygons may be defined via coordinates, such as latitude and longitude coordinates. In other embodiments, a geofence may be defined by a center point and a radius. Thus, in some embodiments, a geofence may be stored by storing the coordinates or center point and radius that define the geofence.

The offers engine 12 may store defined geofences (e.g., polygons, center points and radii, etc.) for providing to a user device. Each geofence may be assigned a unique geofence identifier. Additionally, the offers engine 12 may store additional data associated with a geofence. In some embodiments, the additional data may include a list of merchants associated with the geofence. For example, if the geofence corresponds to real-world shopping mall, the list of merchants associated with the geofence may correspond to the some or all of the stores in the shopping mall. In some embodiments, the obtained geofences and geofence identifiers may be stored (e.g., cached) on the user device. In some embodiments, only the geofence, geofence identifiers may be stored on the user device, such that the additional data associated with a geofence is not stored on the user device, thus minimizing memory usage of the cached geofences.

Next, the traversal of a geofence is detected (block 406). For example, after a user carrying a mobile user device crosses a geofence, the crossing is detected and used in the processing described further below. In some embodiments, the mobile user device may include a program (e.g., a native service or application) that monitors the location of the mobile user device and determines traversal of a geofence. In some embodiments, a program of the mobile user device may monitor the geofences stored (e.g., cached) on the mobile user device and detect traversal of a stored geofence. In some embodiments, an operating system of the mobile user device may provide a framework, advanced programming interface (API) or other components (e.g., the Core-Location Framework provided by Apple, Inc., of Cupertino, Calif.) for determining the location of a mobile user device. In some embodiments for example, the mobile user device may use a service provided by Localpoint® Platform provided by 30 Second Software, Inc. d/b/a Digby of Austin, Tex. or the Gimbal® Platform by Qualcomm Labs, Inc. It should be appreciated that such services may be event-based and may detect generation of an event when the location of the mobile user device changes, such as when the location changes by greater than a threshold amount, changes with respect to detected wireless networks, changes with respect to cellular network towers, and so on. Moreover, it should be appreciated that such services may be selected and implemented with the desire to limit power consumption and maximize battery life of a mobile user device.

After traversal of a geofence, the geofence identifier is transmitted to the offers engine 12 for a determination of relevant candidate offers (block 408). As illustrated in FIG. 4 and described further below, the offers engine 12 may determine candidate offers for the merchants associated with the transmitted geofence identifier. Next, ranked candidate offers 410 are obtained from the offers engine 12 (block 412). In some embodiments, the candidate offers data (e.g., images, text, and other data) is transmitted to and stored (e.g., cached) on the mobile user device. As mentioned above, the candidate offers 410 are determined to be relevant to the merchants associated with the geofence identifier, e.g., the retail stores in a shopping mall within a traversed geofence. Thus, after a user enters a shopping mall or other geofenced geographic area, the user's mobile user device may receive and have access to relevant offers.

Next, the candidate offers are provided to the user via the mobile user device (block 414). In some embodiments, as described below, a notification may be displayed in a user interface of the mobile user device that indicates that offers for the geographic area are available. A user may select the notification to view some or all of the candidate offers. In some embodiments, the candidate offers are provided using a candidate offer flow that is a sequence of candidate offers provided to the user based on flow criteria. As will be appreciated, the candidate offers may be displayed on a display of a mobile user device. In such embodiments, a candidate offer may be displayed in a notification bar or other area of a user interface of a mobile user device. The user may access the relevant offers and purchase goods or services from a merchant after receiving a relevant offer. The flow criteria may include a time period between offers, a score threshold for each candidate offer, a maximum number of candidate offers in a time period, or any combination thereof. For example, the flow criteria may specific a time period between candidate offers, so that the next candidate offer is only displayed after the first candidate offer has been displayed for the time period. In another example, a score threshold may be required for a candidate offer to be provided to a user in the candidate offer flow. In another example, a maximum number of candidate offers in a time period, such that if the maximum number of candidate offers is reached within the time period, no further candidate offers are display until the time period has elapsed.

Figure 5:
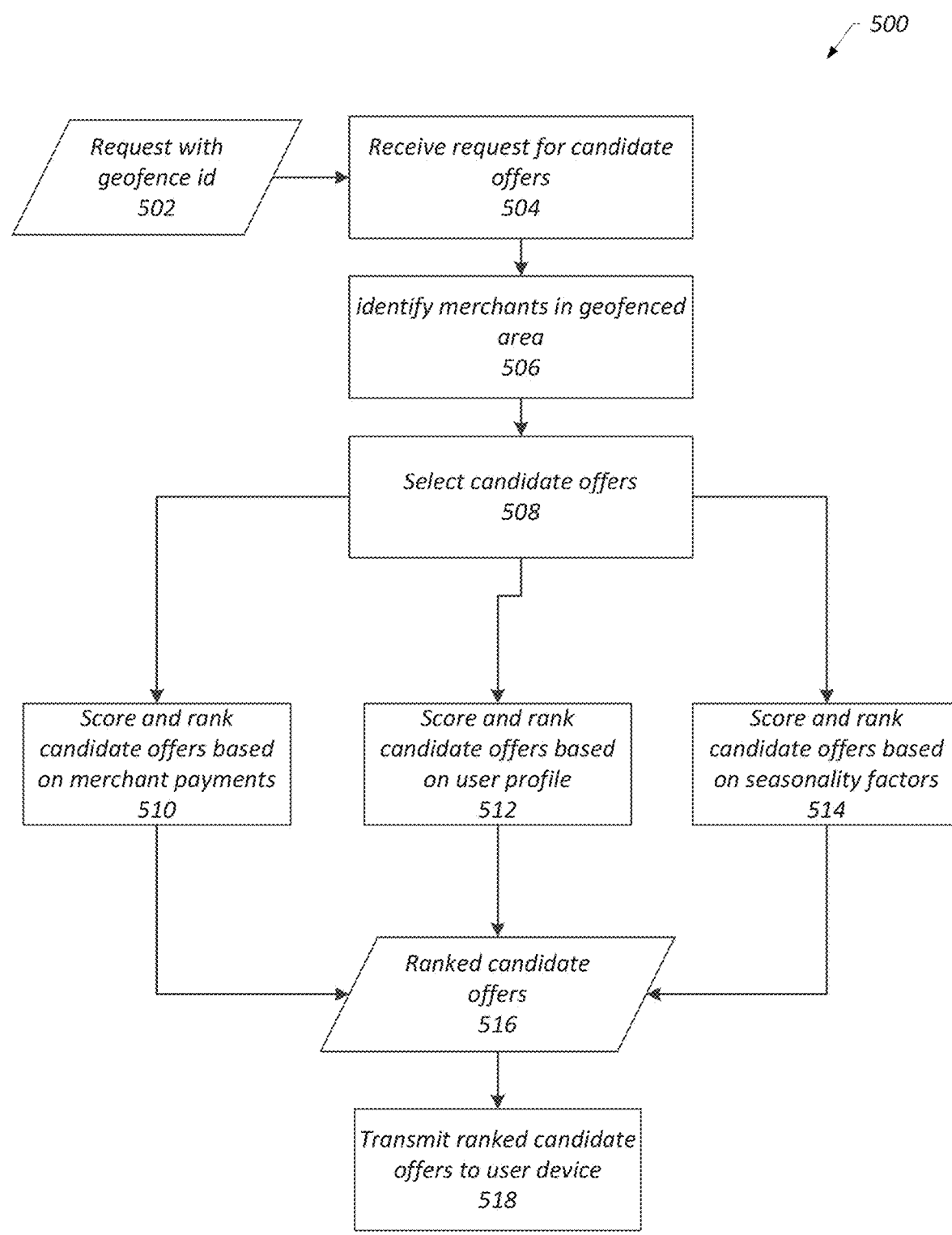
FIG. 5 is a block diagram of a process for determining candidate offers in accordance with an embodiment of the present invention.

FIG. 5 depicts a process 500 for determining candidate offers in accordance with an embodiment of the present invention. The process 500 may be performed by the offers engine 12 in response to a request received from a mobile user device, e.g. mobile user device 28. Initially, a request 502 for candidate offers that has a geofence identifier is received from a mobile user device (block 504). Using the geofence identifier, merchants within the geofenced geographic area are identified (block 506). As described above, geofences stored by the offers engine 12 may be associated with additional data, such as a list of merchants. Thus, after receiving a geofence identifier, the offers engine may identify the list of merchants associated with the geofence identified by the geofence identifier. Next, candidate offers associated with the identified merchants are selected (block 508). As described above, merchant servers provided data to the offers engine 12 regarding offers, and each merchant-offer record may specify applicable terms and conditions of the offers. Thus, when selecting candidate offers, any of the applicable terms and conditions may be used as selection criteria. For example, when providing offers based on a geofenced real-world location, only in-store offers of identified merchants may be selected. Additionally, offers may include offers data about the offer, such as an image of a machine-readable code (e.g., a bar code) to enable redemption an offer.

Next, as described further below, the selected candidate offers may be scored and ranked to produce ranked candidate offers. In some embodiments, only one of the described scorings and associated rankings may be used. In other embodiments, composite scores and rankings using some or all of the described scorings and rankings may be used. Moreover, it should be appreciated that other types of scorings and rankings may be used in addition to as an alternative to the rankings described herein. Moreover, it should be appreciated that a merchant may have one or more candidate offers. In some embodiments, merchants may be sorted by alphabetical order and the candidate offers within each merchant may be ranked according to any one of or combination of the rankings described herein.

In some embodiments, the candidate offers are scored and ranked based on merchant payments for use of the offers (block 510). For example, a first merchant may pay a first payment amount for a first candidate offer, and a second merchant may pay a lower payment amount for a second candidate offer. The first candidate offer of the first merchant associated with the higher payment amount may be scored higher and ranked above the second candidate offer for the second merchant. In some embodiments, candidate offers are scored and ranked based on the likelihood of the user using the offer (block 512), as determined from a user profile associated with the user. For example, the user profile may include previously selected offers, merchants, categories, or any combination thereof, previously ranked offers, merchants, categories, or any combination thereof, and previously shared offers, merchants, categories, or any combination thereof. The user profile may also include the redemption rate of offers and statistics from other similar users. Additionally, in some embodiments the user profile may include the merchants, geofences, or combination thereof frequented by the user. For example, if a user frequents a golf store merchant, golf-related candidate offers may be ranked higher. In another example, if a user is within a geofence for a threshold time period, some candidate offers may be scored and ranked higher.

In some embodiments, the candidate offers are scored and ranked based on seasonality factors (block 514). In such embodiments, some candidate offers may be associated with specific seasons, and such candidate offers may be scored and ranked higher if the associated season matches the current season. For example, is a candidate offer is for sporting goods equipment, the candidate offer may be associated with a summer season and may be ranked higher if the current season is the summer season. Moreover, in some embodiments the candidate offers may be ranked based on time of day (e.g., at 12:00 pm for candidate offers related to lunches), day of the week (e.g., weekends for candidate offers related to weekend services or products) and so on. As mentioned above, any one of or combination of the scorings and rankings may be used to produce ranked candidate offers 516. In some embodiments, the candidate offers are scored and ranked based on their popularity, e.g., the number of users who select a candidate offer, the number of users who redeem a candidate offer, or other suitable popularity metrics. Additionally, in some embodiments curated offers (i.e., "hand-picked" offers) may be scored and ranked higher than other candidate offers. After determining the ranked candidate offers, the ranked candidate offers 516 are transmitted to the user device that send the initial request (block 518). For example, the ranked candidate offers may be transmitted from the offers engine 12 to the mobile user device 28 via the network 48.

Figure 6A:
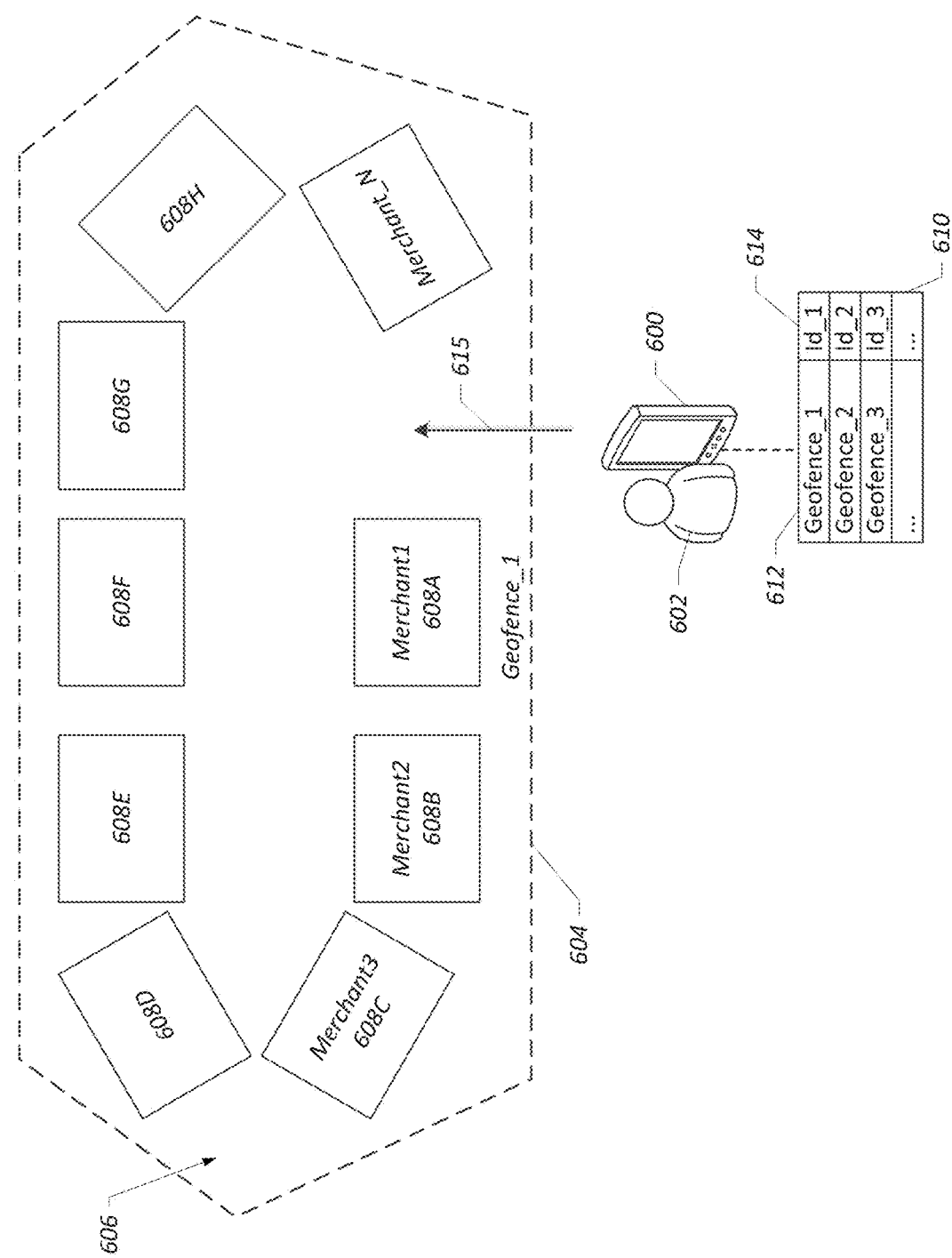
FIGS. 6A and 6B are schematic diagrams that depict a mobile user device of a user interacting with a geofence 604 that encloses a geographic area in accordance with an embodiment of the present invention.
Figure 6B:
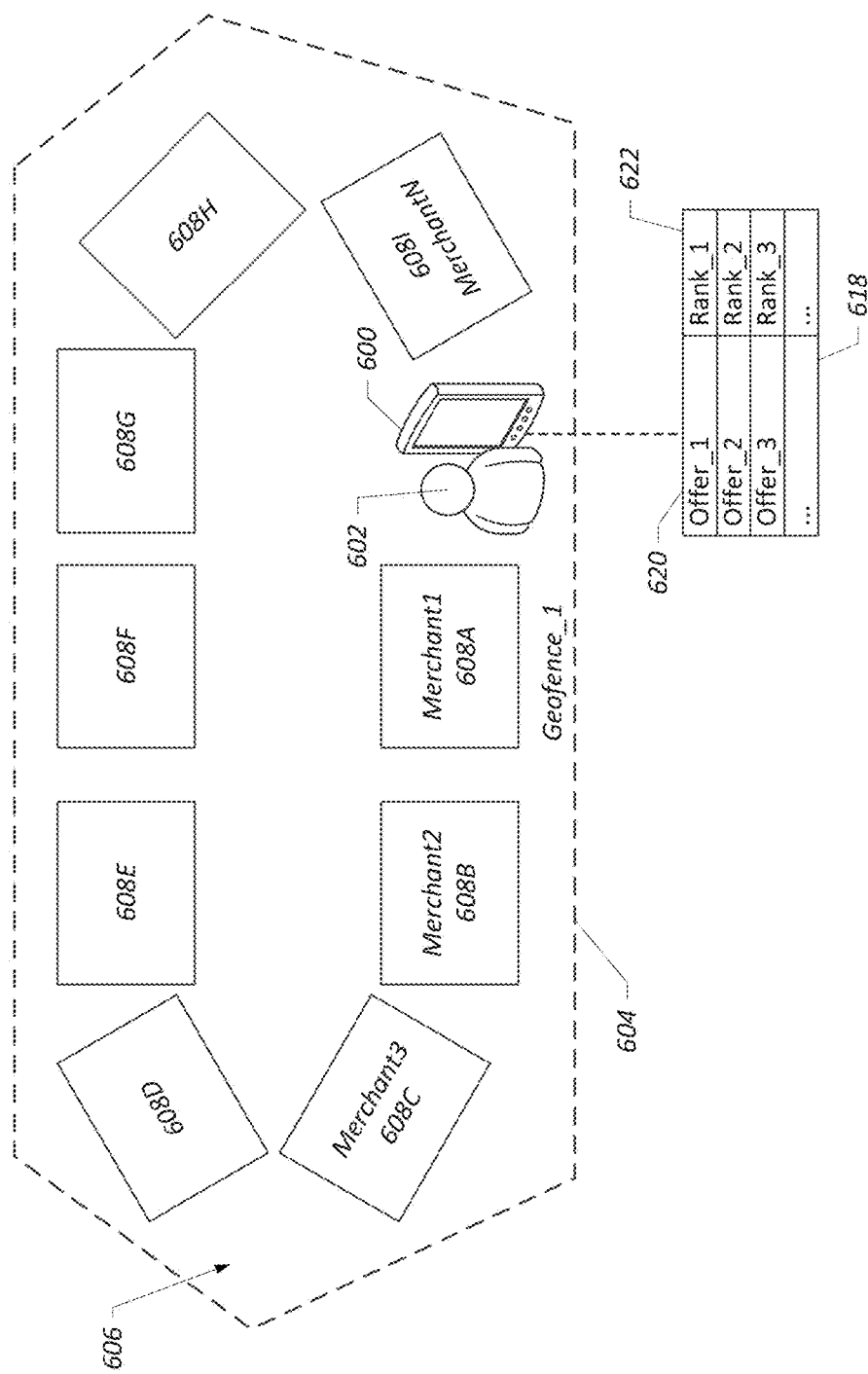

FIGS. 6A and 6B depict a mobile user device 600 of a user 602 interacting with a geofence 604 (Geofence_1) that encloses a geographic area 606 (e.g., a shopping mall) in accordance with an embodiment of the present invention. As shown in FIGS. 6A and 6B, the area 606 may include a number of retail stores 608 associated with various merchants. FIGS. 6A also depicts a portion 610 of a memory of a mobile user device. As discussed above, when the mobile user device 600 is in a location, the mobile user device 600 may obtain geofences within a specific proximity of the location. The memory portion 610 may store (e.g., cache) obtained local geofence data. For example, as shown in FIG. 6A, the local geofence data may include a number of geofences 612 and associated geofence identifiers 614. The geofences 612 thus include, for example, geofence 606 (Geofence_1) and its associated identifier Id_1, Geofence_2 and its associated identifier Id_2, and Geofence_3 and its associated identifier Id_3.

Next, as shown in FIGS. 6A and 6B, the user 602 and mobile user device 600 may traverse the geofence 604 (as indicated by movement arrow 615). As mentioned above, the traversal of the geofence 604 may be detected by the mobile user device 600. After detection of the traversal of the geofence 604, candidate offers are obtained from the offers engine 12 in the manner described above. FIG. 6B depicts another memory portion 616 of the mobile user device 600 illustrating storage of the candidate offers. As shown in FIG. 6B, the memory portion 616 stores candidate offer data. The candidate offer data may include candidate offer identifiers 620 and associated offers data. As also mentioned above, the candidate offers may include rankings 622 used to rank the candidate offers. As will be appreciated, the stored geofences illustrated in FIG. 6A may remain stored on the mobile user device 602 for use after the user leaves the geofenced geographic area 606.

Figure 7A:
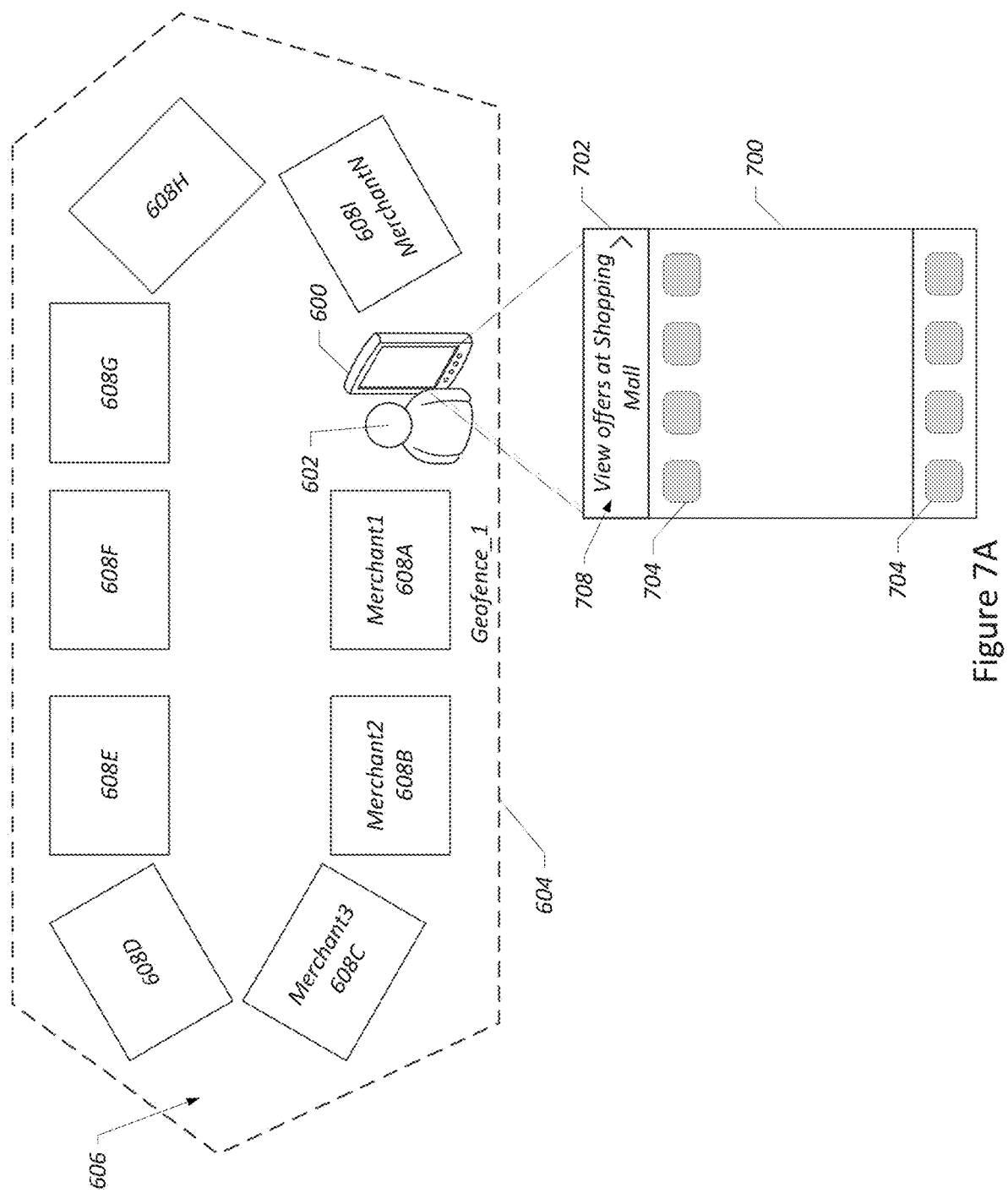
FIGS. 7A-7D are schematic diagrams that depict screens of a mobile user device illustrating display of the candidate offers in accordance with an embodiment of the present invention.

FIGS. 7A-7D depict screens of the mobile user device 600 illustrating display of the candidate offers in accordance with an embodiment of the present invention. The screens of the mobile user device 600 are described with reference to the geofence 604 and geographic area 606 described above and having stores 608 of various merchants. FIG. 7A depicts a screen 700 of the mobile user device 600, such as, for example, a home screen of a user interface. As will be appreciated, the screen 700 and other screens described below may be presented in a user interface of the mobile user device that may receive inputs from a user and provide outputs on a display. In some embodiments, the user interface may include a touchscreen, software modules, or any combination thereof. In such embodiments, inputs may be received as touches on the touchscreen, such as from a digit of a user, a stylus, etc. The screen 700 may include various user interface elements to display information to a user, and in some instances, receive user input. The screen 700 depicts a notification area 702 that displays notifications such as received text messages, received emails, application notifications, and so on. As will be appreciated, however, that the notifications described herein may be displayed in other screens of the user interface, in other areas or components of the user interface (e.g., a pop-up notification) and may be displayed independent of any particular screen or application executed by the mobile user device 600. The notification area 702 may display other information, such as status icons (e.g., battery life, network signal strength), date, time, and so on. As will be appreciated, the screen 700 also depicts user-selectable icons 704 that cause execution of various programs (e.g., application) of the mobile user device 602.

As described above, after the user 602 has traversed the geofence 604 and entered the geographic area 606, the mobile user device 600 may obtain candidate offers associated with the merchants of the retail stores 608. In some embodiments an offers notification 708 may be generated and displayed in the notification area 702 of the screen 700. As shown in FIG. 7A, the offers notification 708 may include notification text ("View offers at Shopping Mall") that may describe the availability of the candidate offers and the specific geographic area ("Shopping Mall") that the user entered when crossing the geofence 604.

Figure 7B:
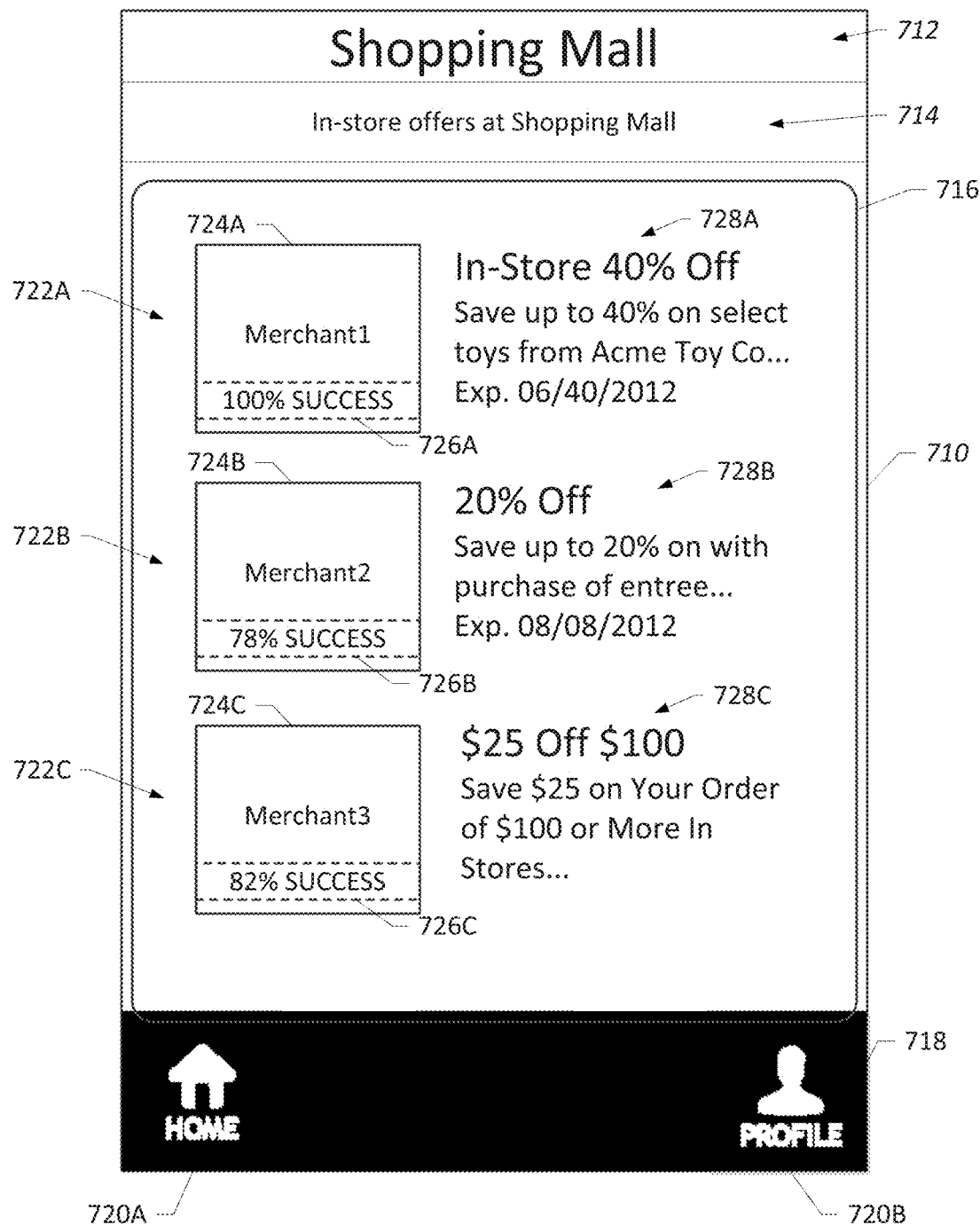

In some embodiments, the notification 708 is a user-selectable notification that enables further display of the candidate offers to the user. FIG. 7B depicts a screen 710 of the mobile user device 600 that may be displayed after a user selects the offers notification 708 described above. In some embodiments, the screen 710 may be a screen of a native application (e.g., native application 52) of the mobile user device 600.

Here again, the screen 710 may include various user interface elements to display information to a user, and in some instances, receive user input. For example, the screen 710 may include a header portion 712, a coupon type title 714, an offer display area 716, and a navigation bar 718. As shown in FIG. 7B, the header portion 712 may be located at the top portion of the screen 710 (e.g., above the coupon type title 714 and the offer display area 716). Similarly, in some embodiments the navigation bar 718 may be displayed below the offer display area 716. In other embodiments, the information in the header portion 712 may be displayed in other areas, such as a footer portion, and the navigation bar 718 may be located in other areas of the application, such as a header portion. In some embodiments, as described below, the notification 708 may consist of a specific candidate offer. In some embodiments, the notification 708 may consist of a specific candidate offer that is user selectable.

The header portion 712 may display a title indicating the contents of the screen 700 presented to the user, as selected by the coupon type title 714. For example, the header portion 712 includes the text "Shopping Mall" to indicate to a user that offers for the Shopping Mall are currently being presented. The coupon type title 714 may include text describing the type of offers displayed in the offer display area 716. For example, as the user is viewing offers for the real-world geographic area ("Shopping Mall"), the coupon type title 714 includes the text "In-store offers at Shopping Mall." The navigation bar 718 may include navigation controls, e.g., buttons 720, such as a "Home" button 720A and a "Profile" button 720B. For example, by selecting the "Home" button 720A, a user may return to a home screen of a native application. Similarly, the selection of the "Profile" button 720B enables a user to access a user profile, such as a user profile associated with the native application.

The offers display area 716 may present offers, e.g., in-store coupons 722, for viewing and selection by a user. For example, as indicated by the coupon type title 714 ("In-store offers at Shopping Mall"), the in-store coupons 714 may be coupons usable at the stores of the identified Shopping Mall. The in-store coupons 722 may include any number of coupons associated with merchants providing goods, services, or a combination thereof As mentioned above, the in-store coupons may be ranked and presented to the user in the ranked order, as described above. In some embodiments, as mentioned above, a curated in-store coupon may be ranked higher than other in-store coupons and may thus be presented at the top of the offer display area.

Each electronic coupon 722 may be presented with information describing the coupon, such as a merchant graphic 724, a success rate banner 726, and a coupon summary 728. The merchant graphic 724 may include a text, image (e.g., a merchant logo), or combination thereof identifying the merchant associated with the coupon. The success rate banner 726 may indicate a success rate for a coupon that indicates the percentage of instances in which the coupon was successfully used. In some embodiments, for example, the success rate may be determined based on user feedback on coupon usage. The coupon summary 728 may include information about the coupon, such as the goods, services, or both associated with the coupon, the discount or other offer provided by the coupon, the expiration date, or any other suitable information or combination thereof.

For example, as shown in FIG. 7B, a first in-store coupon 722A may be presented with a merchant graphic 724A ("Merchant1") and may include a success rate banner 726A indicating the success rate of the coupon ("100% success"). The coupon 722A may be presented with a coupon summary 728A summarizing the discount provided by the coupon ("40% Off Save up to 40% on select toys from Acme Co. . . ."). Additionally, the coupon summary 728A may include the expiration date of the coupon ("Exp. 06/40/2012"). The other coupons 722B and 722C illustrated in FIG. 7B may include similar information, such as merchant graphic 724B, success rate banner 726B, coupon summary 728B, and so on. Additionally, the coupons 722 may include coupons for any type of offer, such as offers for discounts on goods, services or both, and free goods, services, or both. As shown in FIG. 7B, each coupon 722A corresponds to a merchant having a retail store 608 in the geographic area 606 (the identified "Shopping Mall"). For example, coupon 722A is associated with "Merchant1" of retail store 608A, coupon 722B, is associated with Merchant2 of retail store 608B, and so on. However, as will be appreciated, not all merchants in a geographic area may have candidate offers to provide to a user, and some merchants may have multiple candidate offers. In some embodiments, a user may search the in-store coupons 722, such as by keyword or merchant name, in order to identify particular subsets of the in-store coupons 72.

To use a coupon, a user may select (e.g., touch) one of the in-store coupons 722, For example, a user may select any portion of the coupon 722A, such as the merchant graphic 724A, the coupon summary 728A, etc. Upon selection of a coupon, details about the coupon may be presented to enable a user to use the coupon (i.e., redeem the coupon) with a transaction with a merchant In some embodiments, after selecting a coupon for redemption, a bar code or machine-readable code may be displayed on a display of the mobile user device 600. The user may present the display of the mobile user device 600 to a clerk of the retail store, and the clerk may scan the bar code or other machine-readable code at the point of sale to complete redemption of the coupon.

Figure 7C:
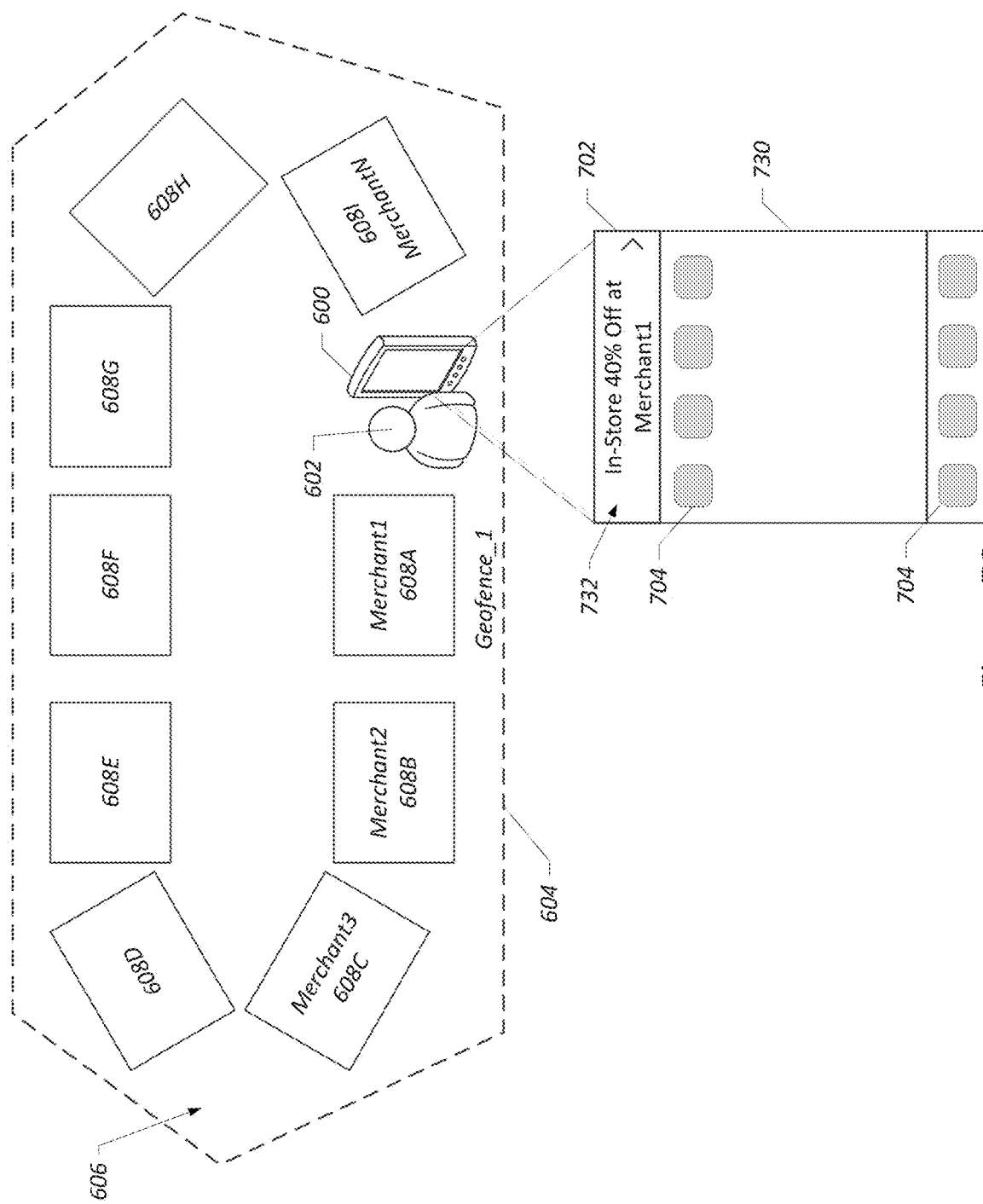
Figure 7D:
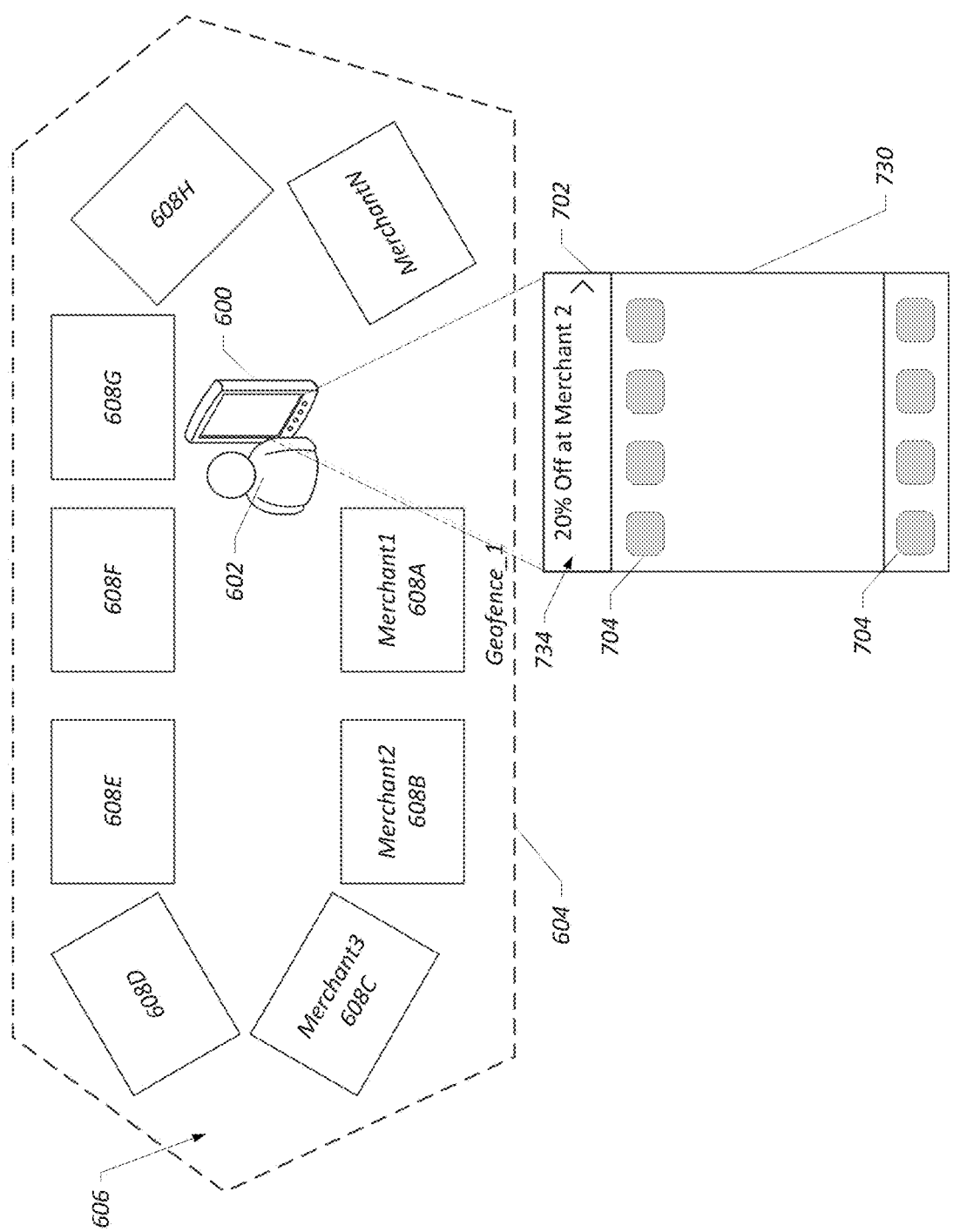

In other embodiments, an offer may be displayed directly in the notification area of a screen of a mobile user device. FIGS. 7C and 7D depict the display of offers in the notification area 702 of the mobile user device 600 in accordance with an embodiment of the present invention. FIG. 7C depicts a screen 730 of the mobile user device 600 as, for example, a home screen of a user interface. In some embodiments, after the user enters the geofenced geographic area 606, a first candidate offer 732 ("In-Store 40% at Merchant1") associated with the merchant of retail store 608A ("Merchant1") may be displayed in the notification area 702. As will be appreciated, the user interface of the mobile user device 600 may enable a user to select the candidate offer 732 from the notification area 702 to see more detail about the offer. After selecting the offer, the user may then choose to redeem the offer at the retail store 608A. As mentioned above, after selecting a coupon for redemption, a bar code or machine-readable representation may be displayed on a display of the mobile user device for presentation at the retail store 608A.

Next, as shown in FIG. 7D, as the user 602 remains in the geographic area 606, a second candidate offer 734 may be displayed in the notification area 702. The second candidate offer 734 may be displayed in response to an evaluation of the candidate offer flow criteria described above. For example, after the first candidate offer 732 has been displayed for a time period, the second candidate offer 734 may be displayed in the notification area 702. The second candidate offer 734 ("20% Off at Merchant 2") may be associated with a merchant of a second retail store 608B ("Merchant2"). Thus, as the user remains in the geographic area 606, the user may be presented with a sequence of candidate offers. As mentioned above, the candidate offers may be presented to the user 602 according to their rankings. Thus, in some embodiments, the first candidate offer 732 displayed in the notification area 702 may have a higher ranking than the second candidate offer 734 subsequently displayed in the notification area 702.

After the user 602 is no longer located in the geographic area 606, the traversal of the geofence 604 may again be detected. After the second traversal of the geofence 604 is detected, the mobile user device 600 may stop providing notifications of candidate offers. For example, the cache of candidate offers may be deleted and the candidate offer flow process may be terminated.

Figure 8:
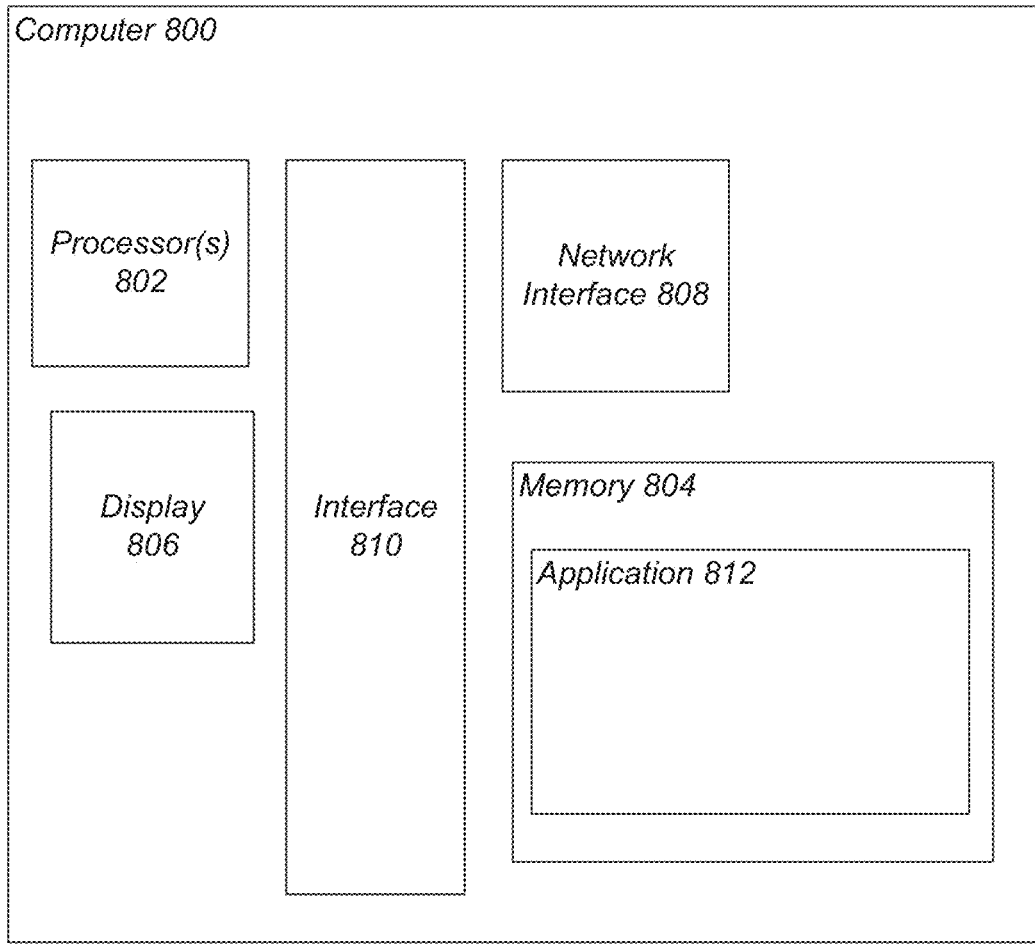
FIG. 8 is a block diagram of a computer in accordance with an embodiment of the present invention.

FIG. 8 depicts of a computer 800 in accordance with an embodiment of the present invention. Various sections of systems and computer-implemented methods described herein, may include or be executed on one or more computers similar to computer 800. Further, processes and modules described herein may be executed by one or more processing systems similar to that of computer 800. The computer 800 may include various internal and external components that contribute to the function of the device and which may allow the computer 800 to function in accordance with the techniques discussed herein. It should further be noted that FIG. 8 depicts merely one example of a particular implementation and is intended to illustrate the types of components and functionalities that may be present in computer 800.

Computer 800 may include any combination of devices or software that may perform or otherwise provide for the performance of the techniques described herein. For example, computer 800 may include a tablet, a mobile phone, such as a smartphone, a video game device, and other hand-held networked computing devices, a desktop user device, a server, or other computing devices. Computer 800 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In addition, the computer 800 may allow a user to connect to and communicate through a network (e.g., the Internet, a local area network, a wide area network, etc.) and may provide communication over a satellite-based positioning system (e.g., GPS). For example, the computer 800 may allow a user to communicate using e-mail, text messaging, instant messaging, or using other forms of electronic communication, and may allow a user to obtain the location of the device from the satellite-based positioning system, such as the location on an interactive map.

As shown in FIG. 8, the computer 800 may include a processor 802 (e.g., one or more processors) coupled to a memory 804, a display 806, and a network interface 808 via an interface 810. It should be appreciated the computer 800 may include other components not shown in FIG. 8, such as a power source (e.g., a battery), I/O ports, expansion card interfaces, hardware buttons, etc. In some embodiments, the display 806 may include a liquid crystal display (LCD) or an organic light emitting diode (OLED) display. The display 806 may display a user interface (e.g., a graphical user interface), and may also display various function and system indicators to provide feedback to a user, such as power status, call status, memory status, etc. These indicators may be in incorporated into the user interface displayed on the display 806. In accordance with some embodiments, the display 806 may include or be provided in conjunction with touch sensitive elements through which a user may interact with the user interface. Such a touch-sensitive display may be referred to as a "touchscreen" and may also be referred to as a touch-sensitive display. In such embodiments, the display 806 may include a capacitive touchscreen, a resistive touchscreen, or any other suitable touchscreen technology.

The processor 802 may provide the processing capability required to execute the operating system, programs, user interface, and any functions of the computer 800. The processor 802 may include one or more processors that may include "general-purpose" microprocessors and special purpose microprocessors, such as one or more reduced instruction set (RISC) processors, such as those implementing the Advanced RISC Machine (ARM) instruction set. Additionally, the processor 802 may include single-core processors and multicore processors and may include graphics processors, video processors, and related chip sets. A processor may receive instructions and data from a memory (e.g., system memory 804). Processes, such as those described herein may be performed by one or more programmable processors executing computer code to perform functions by operating on input data and generating corresponding output.

The memory 804 (which may include tangible non-transitory computer readable storage mediums) may include volatile memory and non-volatile memory accessible by the processor 802 and other components of the computer 800. The memory 804 may include volatile memory, such as random access memory (RAM), and non-volatile memory, such as ROM, flash memory, a hard drive, any other suitable optical, magnetic, or solid-state storage medium, or a combination thereof. The memory 804 may store a variety of information and may be used for a variety of purposes. For example, the memory 804 may store executable code, such as the firmware for the computer 800, an operating system for the computer 800, and any other programs. The executable computer code may include instructions executable by a processor, such as processor 802, and the computer may include instructions for implementing one or more techniques described herein with regard to various processes. For example, the memory 804 may store an application 812. For example, if the computer 800 represents a user device, the application 812 may include a web browser and may enable a user to view offers, such as online coupons, and select and redeem online coupons using the user actions described above. In other embodiments, for example, the computer 800 may represent a server and the application 812 may implement some or all of steps of the process 500 described above and illustrated in FIG. 5. The executable code may be written in a programming language, including compiled or interpreted languages, or declarative or procedural language, and may be composed into a unit suitable for use in a computing environment, including as a stand-alone program, a module, a component, a subroutine. Such code program may be stored in a section of a file that holds other programs or data (e.g., one or more scripts stored in a markup language document), in a single file dedicated to the program in question, or in multiple coordinated files (e.g., files that store one or more modules, sub programs, or sections of code). Additionally, the copies of the executable code may be stored in both non-volatile and volatile memories, such as in a non-volatile memory for long-term storage and a volatile memory during execution of the code.

The interface 810 may include multiple interfaces and may couple various components of the computer 800 to the processor 802 and memory 804. In some embodiments, the interface 810, the processor 802, memory 804, and one or more other components of the computer 800 may be implemented on a single chip, such as a system-on-a-chip (SOC). In other embodiments, these components, their functionalities, or both may be implemented on separate chips. The interface 810 may be configured to coordinate I/O traffic between processor 802, memory 804, network interface 806, and other internal and external components of the computer 800. The interface 810 may include functionality for interfacing via various types of peripheral buses, such as a variant of the Peripheral Component Interconnect (PCI) bus standard, the Universal Serial Bus (USB) standard, and the like.

The computer 800 depicted in FIG. 8 also includes a network interface 808, such as a wired network interface, wireless (e.g., radio frequency) receivers, etc. For example, the network interface 808 may receive and send electromagnetic signals and communicate with communications networks and other communications devices via the electromagnetic signals. The network interface 808 may include known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The network interface 804 may communicate with networks, such as the Internet, an intranet, a cellular telephone network, a wireless local area network (LAN), a metropolitan area network (MAN), or other devices by wireless communication. The network interface 808 may suitable any suitable communications standard, protocol and technology, including Ethernet, Global System for Mobile Communications (GSM), Enhanced Data GSM Environment (EDGE), a 4G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g or IEEE 802.11n), voice over Internet Protocol (VoIP), Wi-MAX, a protocol for email (e.g., Internet message access protocol (IMAP) or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), Short Message Service (SMS), or any other suitable communication protocol.

Those skilled in the art will also appreciate that, while various items are illustrated as being stored in memory or on storage while being used, these items or sections of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-readable medium or a portable article to be read by an appropriate drive, various examples of which are described above. In some embodiments, instructions stored on a computer-readable medium separate from computer 800 may be transmitted to computer 800 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms relating to causal relationships, e.g., "in response to," "upon," "when," and the like, encompass causal relationships having both causes that are a necessary causal condition and causes that are a sufficient causal condition, e.g., "state X occurs upon condition Y obtaining" is generic to "X occurs solely upon Y" and "X occurs upon Y and Z." Similarly, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing or computing device is capable of manipulating or transforming signals, for instance signals represented as physical electronic, optical, or magnetic quantities within memories, registers, or other information storage devices, transmission devices, or display devices of the special purpose computer or similar special purpose processing or computing device.

What is claimed is:

1. A computer-implemented method for determining relevant offers for a geofenced geographic area with a server system while conserving battery power in a mobile user device with which the server system communicates, the method comprising:

receiving, via a network, with the server system, from a native application executing on the mobile user device, a request for geofences in an area of the mobile user device, the request comprising a geolocation of the mobile user device determined based on wireless signals received by the mobile user device;

selecting a plurality of local geofences, via a processor, from a database of geofences, based on proximity between the geofences and the geolocation of the mobile user device;

sending, via the network, the plurality of local geofences to the native application executing on the mobile user device;

receiving, via the network, from the native application executing on the mobile user device, a request for offers, the request comprising a geofence identifier associated with a geofence among the plurality of local geofences previously sent to the mobile user device, the geofence defining a perimeter corresponding to one or more retail stores, the request arising from a program different from the native mobile application executing on the mobile user device detecting traversal of the geofence by the mobile user device;

identifying, via a processor, one or more merchants based on an association of the one or more merchants with the geofence;

identifying, via a processor, a plurality of candidate offers associated with the one or more merchants;

selecting, via a processor, one or more offers based on ranking the plurality of candidate offers; and sending, via the network, the one or more selected offers to the mobile user device.

2. The computer-implemented method of claim 1, wherein identifying a plurality of candidate offers comprises expediting data retrieval by:

querying a cache server, wherein the cache server maintains a cache of offers stored in random access memory of the cache server, the cache of offers having a subset of a larger set of offers, the larger set of offers including copies of at least some of the subset of offers, wherein the subset of offers are each associated with a hash key value calculated based on a respective parameter of the respective offer among the subset and paired with a respective addresses of the respective offer in the random access memory; and identifying responsive offers with the cache server from among the subset of offers based on the query.

3. The computer-implemented method of claim 1, wherein selecting the one or more offers comprises ranking the plurality of candidate offers based on an offers engine user profile associated with a user of an offers engine, the user profile comprising a history of user activity.

4. The computer-implemented of claim 3, wherein the user activity comprises previously selected offers, merchants, categories, or any combination thereof.

5. The computer-implemented method of claim 1, wherein selecting one or more offers comprises ranking the plurality of candidate offers based on a seasonality factor, wherein the one or more candidate offers comprises an in-store coupon having an image of a machine-readable code that is scannable at a point of sale.

6. The computer-implemented method of claim 1, wherein selecting the plurality of local geofences comprises selecting the plurality of geofences based on geolocations of the mobile user device over a set of points in time.

7. The computer-implemented method of claim 1, wherein selecting the one or more offers comprises:

retrieving from a user profile of a user associated with the mobile user device information about a set of offers previously selected by the user; and ranking the plurality of candidate offers based on the retrieved information.

8. A non-transitory, computer-readable memory storing instructions for determining relevant offers for a geofenced geographic area with a server system while conserving battery power in a mobile user device with which the server system communicates, wherein the instructions, when executed by one or more processors, cause the processors to perform operations comprising:

receiving, via a network, from a native application executing on a mobile user device, a request for geofences in an area of the mobile user device, the request comprising a geolocation of the mobile user device determined based on wireless signals received by the mobile user device;

selecting a plurality of local geofences, via a processor, from a database of geofences, based on proximity between the geofences and the geolocation of the mobile user device;

sending, via the network, the plurality of local geofences to the native application executing on the mobile user device;

receiving, via the network, from the native application executing on the mobile user device, a request for offers, the request comprising a geofence identifier associated with a geofence among the plurality of local geofences previously sent to the mobile user device, the geofence defining a perimeter corresponding to one or more retail stores, the request arising from a program different from the native mobile application executing on the mobile user device detecting traversal of the geofence by the mobile user device;

identifying, via a processor, one or more merchants based on an association of the one or more merchants with the geofence;

identifying, via a processor, a plurality of candidate offers associated with the one or more merchants;

selecting, via a processor, one or more offers based on ranking the plurality of candidate offers; and sending, via the network, the one or more selected offers to the mobile user device.

9. The non-transitory, computer-readable memory of claim 8, wherein identifying a plurality of candidate offers comprises:

querying a cache server, wherein the cache server maintains a cache of offers stored in random access memory of the cache server, the cache of offers having a subset of a larger set of offers, the larger set of offers including copies of at least some of the subset of offers, wherein the subset of offers are each associated with a hash key value calculated based on a respective parameter of the respective offer among the subset and paired with a respective addresses of the respective offer in the random access memory; and identifying responsive offers with the cache server from among the subset of offers based on the query.

10. The non-transitory, computer-readable memory of claim 8, wherein selecting the one or more offers comprises ranking the plurality of candidate offers based on an offers engine user profile associated with a user of an offers engine, the user profile comprising a history of user activity.

11. The non-transitory, computer-readable memory of claim 10, wherein the user activity comprises previously selected offers, merchants, categories, or any combination thereof.

12. The non-transitory, computer-readable memory of claim 8, wherein selecting one or more offers comprises ranking the plurality of candidate offers based on a seasonality factor, wherein the one or more candidate offers comprises an in-store coupon having an image of a machine-readable code that is scannable at a point of sale.

13. The non-transitory, computer-readable memory of claim 8, wherein selecting one or more offers comprises:
retrieving from a user profile of a user associated with the mobile user device a set of offers previously selected by the user; and
ranking the plurality of candidate offers based on the retrieved offers.

14. A computer-implemented method for determining offers for a geofenced geographic area while conserving battery power and memory in a mobile user device, the method comprising:
obtaining, based on wireless signals received by the mobile user device, a geolocation of the mobile user device;
sending, via a wireless network, with a native application of the mobile user device, a request for geofences to be selected based on proximity to the geolocation;
receiving, with the native application of the mobile user device, a plurality of responsive geofences from a remote server and storing the plurality of geofences in memory of the mobile user device, the plurality of geofences being selected from a database of geofences accessible to the remote server;
receiving, with the native application of the mobile user device, an event generated by another program executing on the mobile user device, the event being generated by the other program in response to the other program determining that the mobile user device has traversed one of the previously received plurality of geofences;
in response to receiving the event, sending, via a network and from the native application of thee mobile user device, a request for offers to an offers engine, the request comprising a geofence identifier associated with the traversed geofence;
receiving, via a processor and the native application of the mobile user device, one or more offers from the offers engine, the one or more offers pertaining to one or more merchants associated with the traversed geofence; and
providing, via a processor and the native application of the mobile user device, a user-selectable notification in a notification area of a user interface of the mobile user device, the notification containing information about at, or an indication of, least some of the received offers.

15. The computer-implemented method of claim 14, wherein the offers notification comprises an indicator of availability of the at least some of the received offers, and wherein the other program determines that the mobile user device has traversed one of the previously received plurality of geofences in response to the other program determining that the geolocation of the mobile user device has changed by greater than a threshold amount, that the mobile user device has detected a different wireless network, or that the mobile user device has detected a different cellular network tower.

16. The computer-implemented method of claim 14, wherein the one or more offers comprise a ranked plurality of offers, and wherein the information about at least some of the received offers contains information about a first offer among the plurality of offers, the method comprising:
after providing the user-selectable notification, determining that a threshold duration of time has elapsed and, in response, providing another user-selectable notification containing information about a second offer among the plurality of offers, the second offer being ranked lower than the first offer in the ranked plurality of offers.

17. The computer-implemented method of claim 14, wherein the notification comprises a first offer of the one or more offers and does not comprise at least some offers among the one or more offers, the method comprising:
providing a notification of the at least some offers by performing steps for providing a sequence of candidate offers based on flow criteria.

18. The computer-implemented method of claim 14, comprising providing another user-selectable notification comprising a another offer after providing the offers notification, the another notification being provided based on offers flow criteria.

19. The computer-implemented method of claim 18, wherein the offers flow criteria comprises a time period between providing notification of the first candidate offer and the second candidate offer, a maximum number of candidate offers in a time period, a score threshold for a candidate offer, or any combination thereof.

20. The computer-implemented method of claim 14, comprising storing images and text for a plurality of offers in cached storage of the mobile user device upon traversal of the geofence and accessing at least some of the images and text in cache storage after the user enters a building with one or more merchants associated with at least some of the plurality of offers.

21. The computer-implemented method of claim 14, wherein only a subset of information associated with the plurality of geofences by the remote server is stored on the mobile user device before traversal of the geofence to reduce memory usage of cached geofences.

22. A non-transitory, tangible, computer-readable memory storing instructions for determining offers for a geofenced geographic area that, when executed by one or more processors, cause the processors to effectuate operations comprising:
obtaining, based on wireless signals received by the mobile user device, a geolocation of the mobile user device;
sending, via a wireless network, with a native application of the mobile user device, a request for geofences to be selected based on proximity to the geolocation;
receiving, with the native application of the mobile user device, a plurality of responsive geofences from a remote server and storing the plurality of geofences in memory of the mobile user device, the plurality of geofences being selected from a database of geofences accessible to the remote server;
receiving, with the native application of the mobile user device, an event generated by another program executing on the mobile user device, the event being generated by the other program in response to the other program determining that the mobile user device has traversed one of the previously received plurality of geofences;

in response to receiving the event, sending, via a network and from the native application of the mobile user device, a request for offers to an offers engine, the request comprising a geofence identifier associated with the traversed geofence;

receiving, via a processor and the native application of the mobile user device, one or more offers from the offers engine, the one or more offers pertaining to one or more merchants associated with the traversed geofence; and providing, via a processor and the native application of the mobile user device, a user-selectable notification in a notification area of a user interface of the mobile user device, the notification containing information about at, or an indication of, least some of the received offers.

23. The non-transitory, tangible, computer-readable memory of claim 22, wherein the offers notification comprises an indicator of availability of the at least some of the received offers, and wherein the other program determines that the mobile user device has traversed one of the previously received plurality of geofences in response to the other program determining that the geolocation of the mobile user device has changed by greater than a threshold amount, that the mobile user device has detected a different wireless network, or that the mobile user device has detected a different cellular network tower.

24. The non-transitory, tangible, computer-readable memory of claim 22, wherein the one or more offers comprise a ranked plurality of offers, and wherein the information about at least some of the received offers contains information about a first offer among the plurality of offers, the operations comprising:

after providing the user-selectable notification, determining that a threshold duration of time has elapsed and, in response, providing another user-selectable notification containing information about a second offer among the plurality of offers, the second offer being ranked lower than the first offer in the ranked plurality of offers.

25. The non-transitory, tangible, computer-readable memory of claim 22, wherein the offer notification comprises a first offer of the one or more offers and does not comprise at least some offers among the one or more offers, the operations comprising:

providing a notification of the at least some offers by performing steps for providing a sequence of candidate offers based on flow criteria.

26. The non-transitory, tangible, computer-readable memory of claim 25, the operations comprising: providing another notification comprising an candidate offer after providing the notification, the another notification being provided based on offers flow criteria.

27. The non-transitory, tangible, computer-readable memory of claim 26, wherein the offers flow criteria comprises a time period between providing notification of the first candidate offer and the second candidate offer, a maximum number of candidate offers in a time period, a score threshold for a candidate offer, or any combination thereof.

28. The non-transitory, tangible, computer-readable memory of claim 22, the operations comprising: storing images and text for a plurality of offers in cached storage of the mobile user device upon traversal of the geofence and accessing at least some of the images and text in cache storage after the user enters a building with one or more merchants associated with at least some of the plurality of offers.

29. The non-transitory, tangible, computer-readable memory of claim 22, wherein only a subset of information associated with the plurality of geofences by the remote server is stored on the mobile user device before traversal of the geofence to reduce memory usage of cached geofences.

\* \* \* \* \*